(12) United States Patent
Kaizer et al.

(10) Patent No.: US 11,750,401 B2
(45) Date of Patent: Sep. 5, 2023

(54) PROVING TOP LEVEL DOMAIN NAME CONTROL ON A BLOCKCHAIN

(71) Applicant: VERISIGN, INC., Reston, VA (US)

(72) Inventors: Andrew Kaizer, Arlington, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 271 days.

(21) Appl. No.: 17/325,687

(22) Filed: May 20, 2021

(65) Prior Publication Data
US 2022/0376925 A1    Nov. 24, 2022

(51) Int. Cl.
| | | |
|---|---|---|
| *H04L 9/40* | (2022.01) | |
| *H04L 9/32* | (2006.01) | |
| *G06F 16/27* | (2019.01) | |
| *H04L 61/4511* | (2022.01) | |
| *H04L 9/00* | (2022.01) | |

(52) U.S. Cl.
CPC ............ *H04L 9/3247* (2013.01); *G06F 16/27* (2019.01); *H04L 61/4511* (2022.05); *H04L 9/50* (2022.05)

(58) Field of Classification Search
CPC ..... H04L 9/3247; H04L 61/4511; H04L 9/50; G06F 16/27
See application file for complete search history.

(56) References Cited

U.S. PATENT DOCUMENTS

| | | | | |
|---|---|---|---|---|
| 10,721,060 B1 * | 7/2020 | Kaizer | ................... | H04L 9/3247 |
| 11,159,326 B1 * | 10/2021 | Nelson | ................... | G06F 3/0484 |
| 11,392,579 B2 | 7/2022 | Kasimov et al. | | |
| 2007/0130316 A1 * | 6/2007 | Turakhia | ................ | G06Q 30/02 |
| | | | | 709/224 |

(Continued)

FOREIGN PATENT DOCUMENTS

| | | |
|---|---|---|
| WO | 2018007828 A2 | 1/2018 |
| WO | 2022/246189 A1 | 11/2022 |
| WO | 2022/246193 A1 | 11/2022 |

OTHER PUBLICATIONS

International Search Report issued in International Application No. PCT/US22/30241 dated Oct. 6, 2022.

(Continued)

*Primary Examiner* — Ghodrat Jamshidi
(74) *Attorney, Agent, or Firm* — McCarter & English, LLP; Michael A. Sartori

(57) ABSTRACT

Systems, methods, and computer products for associating a top level network identifier with a blockchain address on a blockchain enable operations that may include: obtaining, from a root network segment file, an identification of a server that stores network infrastructure records associating network identifiers under the top level network identifier with network addresses and a signature on the identification of the server; obtaining, based on a first network infrastructure record, an association of the top level network identifier with the blockchain address; obtaining information sufficient to validate a trust chain, wherein the trust chain extends from a trusted authority to the association; and sending the association and the information sufficient to validate the trust chain to an executable program on the blockchain. The trust chain may be validatable by the executable program, and the association may be storable on the blockchain by the executable program.

20 Claims, 8 Drawing Sheets

(56) References Cited

U.S. PATENT DOCUMENTS

| | | | |
|---|---|---|---|
| 2007/0143469 A1* | 6/2007 | Adams | H04L 51/212 709/224 |
| 2008/0235383 A1* | 9/2008 | Schneider | H04L 61/30 709/229 |
| 2011/0296440 A1 | 12/2011 | Launch et al. | |
| 2012/0011360 A1 | 1/2012 | Engels et al. | |
| 2015/0278820 A1 | 10/2015 | Meadows | |
| 2016/0173439 A1* | 6/2016 | Kaliski, Jr. | H04L 61/10 709/245 |
| 2016/0196300 A1* | 7/2016 | Kamdar | H04L 61/302 707/770 |
| 2016/0292672 A1 | 10/2016 | Fay et al. | |
| 2017/0180134 A1 | 6/2017 | King | |
| 2017/0310484 A1* | 10/2017 | Kaliski, Jr. | H04L 63/12 |
| 2017/0324738 A1 | 11/2017 | Hari et al. | |
| 2017/0330174 A1 | 11/2017 | Demarinis et al. | |
| 2017/0344988 A1 | 11/2017 | Cusden et al. | |
| 2017/0346833 A1 | 11/2017 | Zhang | |
| 2018/0227275 A1 | 8/2018 | Russinovich et al. | |
| 2018/0262493 A1 | 9/2018 | Andrade | |
| 2018/0287997 A1 | 10/2018 | Li et al. | |
| 2019/0121988 A1 | 4/2019 | van de Ruit et al. | |
| 2019/0156040 A1 | 5/2019 | Sasin et al. | |
| 2019/0166085 A1 | 5/2019 | Li et al. | |
| 2019/0220831 A1 | 7/2019 | Rangarajan | |
| 2019/0253252 A1 | 8/2019 | Qui | |
| 2019/0333054 A1* | 10/2019 | Con | G06Q 20/383 |
| 2020/0021446 A1 | 1/2020 | Roennow et al. | |
| 2020/0145373 A1 | 5/2020 | Richardson | |
| 2020/0314055 A1* | 10/2020 | Blinn | H04L 61/4511 |
| 2020/0328883 A1 | 10/2020 | Kaizer et al. | |
| 2021/0037013 A1 | 2/2021 | Salkintzis | |
| 2021/0135867 A1* | 5/2021 | Zeng | H04L 63/12 |

OTHER PUBLICATIONS

International Search Report and Written Opinion issued in International Application No. PCT/US2019/038447 dated Sep. 30, 2019, pp. 1-15.

Domraider, "ICO Whitepaper," www.domraider.io, SIRET 79417114000013 [retrieved on Aug. 25, 2019], Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019], Retrieved from the Internet: URL:https://pdfs.semanticscholar.org/7e38/b0c0e6f7066de9821b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/20 17/TCD-SCSS-DISSERTA TION-2017-015.pdf pp. 1-89.

International Preliminary Report on Patentability issued in International Application No. PCT/US2019/038447 dated Jan. 7, 2021, pp. 1-13.

Notice of Allowance issued in U.S. Appl. No. 16/024,488 dated Mar. 13, 2020, 30 pages.

Office Action issued in U.S. Appl. No. 16/402,047 dated Feb. 1, 2021, 14 pages.

Office Action issued in U.S. Appl. No. 16/402,047 dated May 11, 2021, 9 pages.

Office Action issued in U.S. Appl. No. 16/515,825 dated Apr. 15, 2021, 14 pages.

Office Action issued in U.S. Appl. No. 16/402,047 dated Aug. 9, 2021, 10 pages.

Office Action issued in U.S. Appl. No. 16/515,825 dated Sep. 20, 2021, 19 pages.

Baritz et al., ID4me—Technical White Paper DRAFT, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", Retrieved from the Internet: https://blog.undeveloped.com/domain-industry-join-us-in-becoming-innovative-thriving-again-a751d2e17ae9, Nov. 21, 2017 [retrieved on Sep. 17, 2021], pp. 1-6.

DNS Registrar guide—Ethereum Name Service, Retrieved from the Internet on Sep. 22, 2021: https://docs.ens.domains/dns-registrar-guide, pp. 1-5.

Einarrson, B., "[DNSOP] Verifying TLD operator authorisation," Retrieved from the Internet: https://mailarchive.ietf.org/arch/msg/dnsop/qaDjnArp98T0glBYQbUfswwaxrg, Jun. 18, 2019 [retrieved on Sep. 17, 2021], 1 page.

Hollenbeck, S., "Extensible Provisioning Protocol (EPP) Domain Name Mapping," RFC 4931, Retrieved from the Internet: https://datatracker.ietf.org/doc/html/rfc4931, May 2007 [retrieved on Sep. 7, 2021], pp. 1-46.

Hollenbeck, S., "Extensible Provisioning Protocol (EPP)," RFC 5730, Retrieved from the Internet: https://datatracker.ietf.org/doc/html/rfc5730. Aug. 2009 [retrieved on Sep. 7, 2021], pp. 1-67.

Hollenbeck et al., "Security Services for the Registration Data Access Protocal (RDAP)," RFC 7481, Retrieved from the Internet: https://tools.ietf.org/html/rfc7481, Mar. 2015 [retrieved on Sep. 7, 2021], pp. 1-13.

Johnson, N., "[DNSOP] Verifying TLD operator authorisation," Retrieved from the Internet: https://mailarchive.ietf.org/arch/msg/dnsop/AX5D3cqSTWF69pAWqu5Pn6SGXDs, Jun. 14, 2019 [retrieved on Sep. 17, 2021], 1 page.

Johnson, N., "ENS Root Change Will Allow Easy Integration of More Than 1300 DNS TLDs," Retrieved from the Internet: https://medium.com/the-ethereum-name-service/upcoming-changes-to-the-ens-root-a1b78fd52b38, Feb. 25, 2019 [retrieved on Sep. 7, 2021], 4 pages.

Johnson, N., "Introducing .luxe on ENS," Retrieved from the Internet: https://medium.com/@weka/introducing-luxe-on-ens-35a9ee2383ce, Oct. 2, 2018 [retrieved on Sep. 7, 2021], 4 pages.

Kuhl, R., "[DNSOP] Verifying TLD operator authorisation," Retrieved from the Internet: https://mailarchive.ietf.org/arch/msg/dnsop/DQEjRQzAafeGoMckNTt5GxSTe9g, Jun. 14, 2019 [retrieved on Sep. 17, 2021], 1 page.

Millegan, B., "ENS + .KRED: Major Integration of DNS and ENS Launches," Retrieved from the Internet: https://medium.com/the-ethereum-name-service/ens-kred-major-integration-of-dns-and-ens-launches-e7efb4dd872a, Feb. 19, 2020 [retrieved on Sep. 7, 2021], 3 pages.

Millegan, B., "Ethereum Name Service," Retrieved from the Internet on Sep. 7, 2021: https://vir.isi.edu/events/dinr2020/S/blantly-ENS.pdf, 24 pages.

Millegan, B., "Linking DNS with blockchain-based ENS records," Retrieved from the Internet on Sep. 7, 2021: https://ccnso-icann.org/sites/default/files/field-attached/presentation-dns-blockchain-ens-24jun19-en.pdf, 31 pages.

Monster, R., "Domain Leasing : How we do it at Epik, and how you can tool," Retrieved from the Internet: https://www.epik.com/blog/leasing-domains-how-we-do-it-at-epik-and-how-you-can-too.html, Mar. 27, 2020 [retrieved on Sep. 7, 2021], 14 pages.

Verisign, Inc., "Ethereum Name Service (ENS) Root Change Issues," Verisign Technical Note, Retrieved from the Internet: https://www.verisign.com/assets/labs/ens-root-change-issues-5.2020.pdf, Apr. 12, 2019 [retrieved on Sep. 22, 2021], pp. 1-2.

\* cited by examiner

PROVING TOP LEVEL DOMAIN NAME CONTROL ON A BLOCKCHAIN

FIELD

This disclosure relates generally to blockchain addresses, and, more particularly, associating blockchain addresses with top level network identifiers such as top level domain names.

BACKGROUND

A network identifier infrastructure system may assign network identifiers to network resources present at network addresses. Network identifiers may include alphanumeric strings. For example, network identifiers may include human-readable names. Examples of network identifiers include internet domain names, social media handles, telephone numbers, email addresses, and digital object architecture handles. Network identifiers may be organized in a hierarchy, with top level network identifiers at the top, and any number of network identifiers below them in the hierarchy. The network resources to which such network identifiers are assigned by the network identifier infrastructure system may be any of a variety of network resources, such as network-connected computers, social media accounts, telephone connections, email servers, or digital object architecture objects. For example, an assignment may associate, link, or couple a network identifier with a network address for a network resource. The network addresses may be in the form of numerical labels, for example, internet protocol (IP) addresses or blockchain addresses (described further below). Such numerical labels may be difficult for typical humans to remember. Thus, network infrastructure systems may, for example, assign human-friendly network identifiers to network resources present at network addresses that are inconvenient for humans to retain and utilize. Typically, one network identifier is associated with one network address in a network identifier infrastructure system, although there can be a many-to-one relationship in some instances.

A particular type of network identifier infrastructure system is a domain name system (DNS). The term domain name system (DNS) may refer to, for example, a network identifier infrastructure system, such as a hierarchical distributed network identifier infrastructure system, for resources provided by computer servers that are connected to the internet. A DNS may associate a network identifier, such as domain name, to a network address, such as a numeric internet protocol (IP) address, of an internet resource. A DNS may thus allow computers to access networked resources, including web pages, using the assigned names.

In general, network infrastructure information (e.g., associations of network resources with network identifiers, public keys of asymmetric key pairs, signatures, etc.) may be stored in network infrastructure records. Further, network identifier infrastructure systems may include one or more authoritative record keepers or authoritative record entities. For example, a network identifier infrastructure system may include a network-accessible authoritative database that stores multiple network infrastructure records. Such an authoritative database may provide network infrastructure records to other, e.g., non-authoritative, network-accessible databases in the network. Some network identifier infrastructures are hierarchical, e.g., an authoritative record keeper or authoritative record entity may provide network infrastructure records to network-accessible databases that are under the authoritative record keeper or authoritative record entity in the hierarchy. Some such network identifier infrastructure systems may be structured such that an authoritative record keeper or authoritative record entity provides network infrastructure records to segments of the network, e.g., to portions of the network identifier namespace. For example, such a network identifier infrastructure system may provide to a respective database for that segment a network segment file, which may include network infrastructure records for resources that are present in that particular network segment.

An authoritative record keeper or authoritative record entity, such as in the context of a DNS, may be referred to as, for example, a registry. A registry may include an authoritative, master database of domain names registered under a top-level domain, or other domain in which domain names can be registered. A registry may include many hardware computer servers operably coupled to the internet. For ease of discussion, a registry may be identified with its computer servers and systems. Further, such as in the context of a DNS, network infrastructure records may be referred to as resource records or records, a network segment may be referred to as a zone, and a file of resource records for a particular zone may be referred to as a zone file.

Network identifier infrastructure systems may utilize a registration facilitator(s) or a registration entity(ies) to register network identifiers to entities referred to as registrants. For example, a registration facilitator or registration entity may act as an intermediary between an authoritative record keeper or authoritative record entity and a person or end user entity that wishes to register a network identifier. The registration facilitator or registration entity may charge a fee to the registrant and convey registration information, e.g., the network identifier and a network address to which it is to be associated, to an authoritative record keeper or authoritative record entity. The authoritative record keeper or authoritative record entity may update its records accordingly. According to some networks, registrants are unable to directly interact with an authoritative record keeper or authoritative record entity, and instead interact through registration facilitator or a registration entity.

In the context of a DNS, a registration facilitator or registration entity may be referred to as a registrar. Registrars may facilitate registration of domain names to registrants in the DNS. Registrars may compete with one another to register domain names for registrants through the DNS registry. For example, an internet user may interact with a registrar to register a domain name, thereby becoming a registrant for the domain name. Registrars may include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

The term network identifier infrastructure operator may refer to an authoritative record keeper or a registration facilitator, for example. Similarly, the term DNS operator may refer to a registry or registrar, for example.

An electronic ledger that records transactions may be referred to as a blockchain. Such transactions may include, for example, but are not limited to, cryptocurrency transactions. In general, a blockchain may be implemented as a decentralized distributed readable and writeable computer interpretable data structure, stored in various computers (e.g., nodes) in a blockchain network (e.g., a cryptocurrency network). A blockchain may be constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of one or more transactions, a transaction identifier, a transaction amount, and the address associated with the receiving party (e.g., associated with the receiving party's public key).

Blockchain users may have an associated blockchain address and/or cryptographic key pair, e.g., an asymmetric cryptographic key pair. Such a key pair may be referred to as the user's blockchain key pair that includes or consists of a public key (e.g., usable by the user to receive cryptocurrency) and a private key (e.g., usable by the user to send cryptocurrency). Each blockchain user may have a blockchain address that may serve as the user's identifier for purposes of the blockchain. For example, the blockchain address may be derived from the public key of the user's blockchain key pair, e.g., by applying a hash function. A first blockchain user may receive cryptocurrency from a second blockchain user, for example, who utilizes a blockchain address of the first blockchain user.

SUMMARY

Various embodiments include systems, methods, and computer products and media for associating a top level domain name with a blockchain address on a blockchain. In various implementations, the systems, methods, and computer products may perform, execute or enable operations, functions, and/or behaviors that include: obtaining, from a Domain Name System (DNS) root zone file, a DNS resource record comprising an identification of a domain name identifying a zone file, and a DNS resource record comprising a signature on the identification of the domain name for the zone file; obtaining, based on a first DNS resource record stored in the zone file, an association of the top level domain name with the blockchain address; obtaining information sufficient to validate a trust chain, wherein the trust chain extends from a DNS root zone to the first DNS resource record, wherein information sufficient to validate the trust chain comprises a signature for the association; and sending the association and the information sufficient to validate the trust chain to an executable program on the blockchain, wherein the trust chain is validatable by the executable program on the blockchain, and wherein the association is storable on the blockchain by the executable program on the blockchain.

Various additional embodiments include systems, methods, and computer products and media for associating a top level network identifier with a blockchain address on a blockchain. In various implementations, the systems, methods, and computer products may perform, execute or enable operations, functions, and/or behaviors that include: obtaining, from a root network segment file, an identification of a server that stores network infrastructure records associating network identifiers under the top level network identifier with network addresses and a signature on the identification of the server; obtaining, based on a first network infrastructure record stored by the server, an association of the top level network identifier with the blockchain address; obtaining information sufficient to validate a trust chain, wherein the trust chain extends from a trusted authority to the association, wherein information sufficient to validate the trust chain comprises at least a signature for the association; and sending the association and the information sufficient to validate the trust chain to an executable program on the blockchain, wherein the trust chain is validatable by the executable program on the blockchain, and wherein the association is storable on the blockchain by the executable program on the blockchain.

In some embodiments, the first network infrastructure record comprises the association, and obtaining the association of the top level network identifier with the blockchain address includes: parsing the first network infrastructure record stored by the server to obtain the association.

In some embodiments, the operations further include: obtaining, from the root network segment file, an identification of a second server that stores network infrastructure records associating network identifiers under the top level network identifier with network addresses; and obtaining, based on a second network infrastructure record stored by the second server, a second association of the top level network identifier with a second blockchain address; and conflict between the blockchain address and the second blockchain address is resolved.

In some other further embodiments, the first network infrastructure record comprises an identification of a second server that stores network infrastructure records associating network identifiers under the top level network identifier with network addresses, and the obtaining, based on the first network infrastructure record stored by the server, the association of the top level network identifier with the blockchain address includes: parsing a second network infrastructure record stored by the second server to obtain at least the association of the top level network identifier with the blockchain address. In some such embodiments, the second network infrastructure record comprises information for distributing, from a primary computer to a secondary computer, network infrastructure records associating network identifiers under the top level network identifier with network addresses, wherein the information comprises data stored in a field reserved for an email address. In other such embodiments, the second network infrastructure record comprises information for distributing, from a primary computer to a secondary computer, network infrastructure records associating network identifiers under the top level network identifier with network addresses, wherein the information comprises data stored in a field reserved for an identification of the primary computer.

In further embodiments, the trust chain comprises a plurality of nodes between the trusted authority and the association of the top level network identifier with the blockchain address, wherein each node of the plurality of nodes either comprises a signature from a private key of an asymmetric cryptographic key pair associated with a preceding node, or provides a signature from a private key of an asymmetric cryptographic key pair to a succeeding node. In some such embodiments, at least one of the plurality of nodes comprises a key signing key node, a zone signing key node, or a delegation signer node.

In yet further embodiments, sending the association and the information sufficient to validate the trust chain to the executable program on the blockchain includes: sending, by an authoritative network infrastructure record keeper, at least the association of the top level identifier with the blockchain address and the trust chain to the executable program on the blockchain.

In various system implementations, the system may include: a memory containing instructions; and a processor, operably connected to the memory, that executes the instructions to perform, execute, or enable the operations, functions, and/or behaviors described herein.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
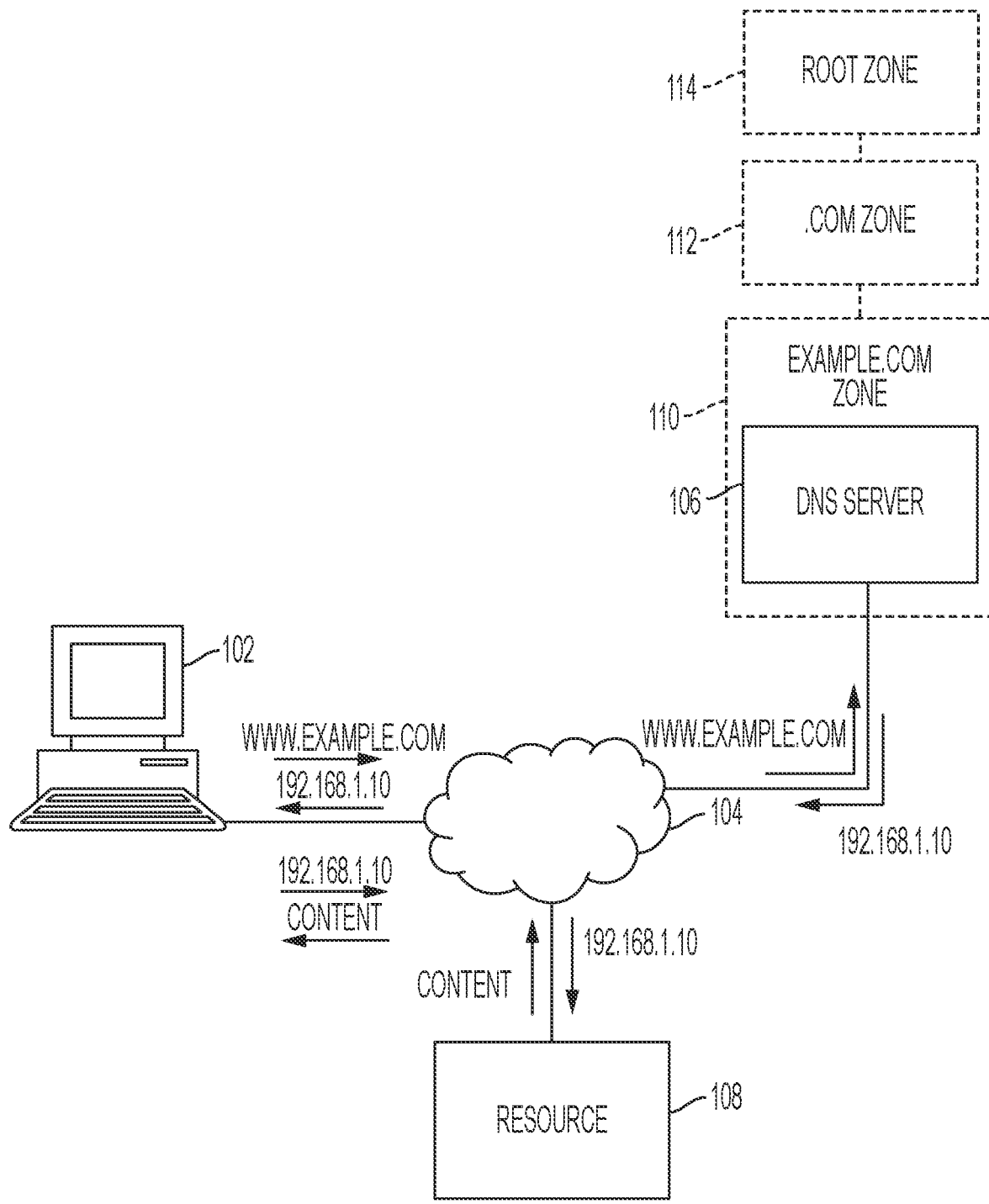
FIG. 1 is a schematic diagram depicting an example DNS interaction with a client.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Various embodiments provide techniques for proving control of a top level network identifier, or the like, in a network identifier infrastructure system. Embodiments may be used by an authoritative record keeper or a registration facilitator to prove such control, for example. In the context of a DNS in particular, some embodiments provide systems, methods, and techniques for proving control of a top level domain name, such as dot COM, dot NET, dot EDU, etc. For example, a DNS registry or registrar may use an embodiment to prove control of a top level domain name. Similarly, embodiments withing the scope of this disclosure include systems, methods, and techniques for proving control of a second-level domains and the like that serve as public suffixes. Such second-level domains and the like may be managed by an operator at the second (or lower) level (e.g., an authoritative record keeper or a registration facilitator at the second level), instead of or in addition to the TLD operator. Examples include second-level domains such as ".co.uk", ".co.in", ".co.jp", ".ac.uk", ".ac.jp", country code second-level domains, and the like.

The proof of control produced by embodiments may be forwarded to and used by a blockchain. For example, some embodiments may use a proof of control of a top level identifier to associate, link, or couple the top level identifier with a blockchain address in a blockchain. According to such embodiments, the blockchain address may be for an executable program on the blockchain, e.g., a smart contract. Thus, some embodiments may be used to associate a top level identifier with an executable program on a blockchain.

In some blockchains, entities that prove control of an identifier at a particular level, such as a top level, in the network identifier infrastructure hierarchy are authorized to establish associations of identifiers lower in the hierarchy with blockchain addresses. According to some embodiments, once a top level identifier is associated with an executable program on such a blockchain, a registrant of a network identifier that is under the top level identifier in the hierarchy can use the program to establish an association of its network identifier with its blockchain address. Once the association of the lower level network identifier with the blockchain address is established in the blockchain, the registrant of the lower level network identifier, or any other entity, can then use the lower level network identifier to find and/or access the associated blockchain address in conducting blockchain transactions. This enables a human friendly way to interact with other blockchain users by using a domain name to indicate or refer to a blockchain addresses instead of a numeric or alphanumeric (e.g., hexadecimal) blockchain address. For example, from the user's perspective in interacting with a blockchain through software, a domain name may be used instead of the blockchain address to which it is associated or linked. For example, a first user may send cryptocurrency to a second blockchain user by specifying a cryptocurrency amount and the second user's domain name to a blockchain interface, e.g., a wallet (described further below). Thus, the association permits blockchain users to utilize their unique identifier or web presence, e.g., example.com, instead of their blockchain address or blockchain presence.

An association of a network identifier, such as a domain name, with a blockchain address may be implemented at least in part by storing a representation of the association, e.g., in a location accessible by the blockchain, such as in the blockchain itself. The association may be stored in a table, for example, where one column in the table stores a representation of the network identifier (e.g., the network identifier itself) and another column stores the corresponding associated blockchain address. Additional columns may store additional information according to various embodiments. The arrangement of the columns may appear in any order. Alternately, or in addition, the association may be stored in the form of a tuple, e.g., <network identifier, blockchain address>. Such a form of association storage is not limited to doubles or 2-tuples (e.g., attribute-value pairs); additional elements may be included to larger n-tuples where n>2, according to various embodiments, e.g., <network identifier, blockchain address, first other data, second other data, . . . >. The elements of such n-tuples may appear in any order. From the perspective of a blockchain user, the stored association may not be visible, but such a user may use its network identifier instead of its blockchain address, e.g., in interacting with blockchain software.

By way of non-limiting example, in the context of a DNS, a DNS registry for dot TLD (where "TLD" is a top level domain name such as COM, NET, EDU, etc.) may use an embodiment to prove control of dot TLD and associate or link dot TLD with a blockchain address, by way of non-limiting example, for an executable program on the blockchain. Subsequently, a registrant of example.TLD can interact with the executable program to associate, link, or couple example.TLD with its blockchain address and use example.TLD as a network identifier for the blockchain, e.g., for conducting transactions.

For purposes of illustration rather than limitation, some embodiments are presented herein in the context of a DNS. For example, the embodiments of FIG. 4 utilize a name server to prove control of a top level domain name, the embodiments of FIG. 5 utilize an RNAME field in a Start Of Authority (SOA) resource record to prove control of a top level domain name, and the embodiments of FIG. 6 utilize an MNAME field in a SOA resource record to prove control of a top level domain name. In such embodiments, the SOA resource record may be created and/or configured to support the embodiments described herein. However, embodiments are not limited to DNS environments. Rather, disclosed embodiments, including those presented in reference to FIGS. 4-7, may be implemented in any network infrastructure system.

These and other feature and advantages are presented in detail herein.

II. Resource Records and Trust Chains

FIG. 1 is a schematic diagram depicting, by way of background, an example DNS interaction. The interaction depicted by FIG. 1 does not necessarily involve an embodiment of the invention. Instead, FIG. 1 depicts an overview of one example of how a DNS enables the internet to operate using domain names instead of numerical internet protocol (IP) addresses. Although networked computers generally rely on network addresses such as IP addresses, human are ill-equipped to memorize such locators. Accordingly, a DNS enables humans to use easy-to-remember domain names, if they so desire, as network identifiers to access resources and data.

A user may operate client computer 102. The user may enter a domain name, e.g., www.example.com, in the navigation field of a web browser executing on client computer 102. Client computer 102 may operate and/or contact a recursive DNS server to look up the IP address corresponding to www.example.com. In particular, client computer 102 may send a resource record query to the recursive DNS server. For purposes of this example, the recursive DNS server lacks a resource record for www.example.com. According to the DNS protocol, the recursive DNS server may in this example query the root zone 114 for this resource record. By way of a DNS name server (NS) resource record, the root server points to a DNS server for the .com zone 112, which provides an NS resource record that points to DNS server 106 for the zone for example.com, again, relying on an NS resource record. DNS server 106 responds with an appropriate DNS resource record (e.g., A or AAAA) that includes the requested IP address. Client computer 106 receives the resource record and parses it to extract the IP address. Client computer then contacts the IP address, which leads to resource 108, which may be a server computer. Resource 108 responds to the client computer with the requested data, e.g., content.

Standing alone, a DNS protocol or process may not include any authentication mechanism for checking the validity of data sent between and from DNS servers. For example, a DNS that does not include authentication may be exposed to certain attacks, such as spoofing and man-in-the-middle attacks. Accordingly, DNS benefits from security provided by the DNS Security (DNSSEC) standard, which utilizes trust chains.

In general, a trust chain may include, for example, a directed series of nodes, each of which authenticates the following node in the chain. The first node in a trust chain may be authenticated by an external trust anchor. The nodes may be implemented as computer-interpretable, electronically stored records that include authentication information, such as a digital signature, public key, digital certificate, or hash. Such records may be implemented as resource records, such as, for example, but not limited to, public key resource records (e.g., DNSKEY resource records), delegation signer resource records (e.g., DS resource records), and/or signature resource records (e.g., RRSIG resource records). A relying party who trusts only the trust anchor can authenticate every node in the chain, including an object at the end of the trust chain.

Trust chains may not only provide scalable ways for an application to authenticate information throughout a trust hierarchy, but may also be transferrable. For example, an application or relying party can forward a trust chain to another relying party, who can then authenticate the same information itself without further interaction with other services.

In the context of a DNS, for example, a DNSSEC trust chain may start with a DNSSEC root public key and extend through the DNS hierarchy via a series of digital signatures on DNS resource records or specific hashes of public keys. The links between nodes within a DNSSEC trust chain may take the form of either a public key in one node with a signature by the corresponding private key on the next, or a hash of a public key in one node with the corresponding public key in the next. For example, resource records in a DNSSEC trust chain can include either public keys for verifying digital signatures on subsequent resource records (e.g., Delegation Signer (DS) resource records, and Zone Signing Keys (ZSK)), or hashes of public keys of subsequent resource records (e.g., Key Signing Keys (KSK)). For DS and ZSK records, for example, a node may be authenticated by verifying its digital signature with a prior node's public key. For KSK records, for example, the node may be authenticated by comparing the hash of its content with a prior node's value.

Figure 2:
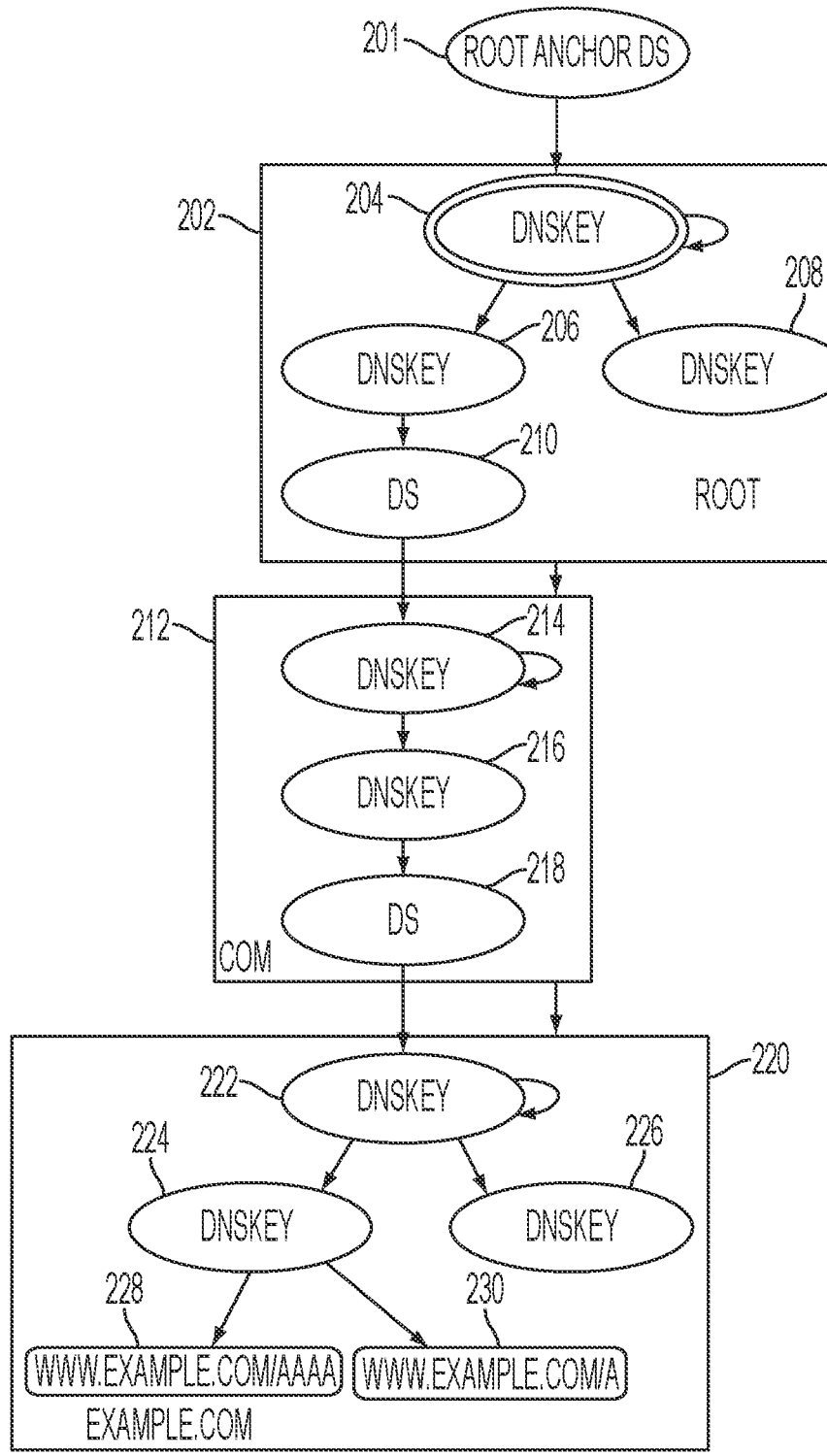
FIG. 2 is a schematic diagram of a DNS trust chain.

FIG. 2 is a schematic diagram of a DNSSEC trust chain, according to an embodiment. The exemplary DNSSEC trust chain in this diagram has a total of 13 nodes 201, 204, 206, 208, 210, 214, 216, 218, 222, 224, 226, 228, and 230, including a root anchor DS node 201 and nodes in three groups 202, 212, 220, which correspond to zones 114 (root zone), 112 (dot corn zone), 110 (example.com zone), respectively, of FIG. 1. The nodes 204, 206, 208, and 210 are for the root zone group 202, In this example, resource records 206 and 208 are alternative second nodes.

The top of the trust chain is root anchor delegation signer (DS) DNS resource record 201. The root anchor DS DNSSEC resource record 201 may include a hash of the root zone's key signing key (KSK) of node 204. Although FIG. 2 depicts a trust chain with thirteen nodes in total, 201, 204,

206, 208, 210, 214, 216, 218, 222, 224, 226, 228, and 230, trust chains are not so limited. In general, a trust chain may include any number of nodes. Further, in general, trust chains may include any type of nodes, and are not limited to DNSKEY and DS nodes as shown in the example of FIG. 2.

After root public key 201, the first DNSKEY resource record 204 in the first group may be for the root zone's key-signing key (KSK). This KSK may also form part of the external trust anchor. The DNSKEY resource records 206, 208 may be for the root zone's zone-signing keys (ZSKs), which are signed by the private key corresponding to the KSK. In the example shown, only DNSKEY resource record 206 is part of the trust chain for example.com. A different trust chain (not shown) may be continued from DNSKEY resource record 208. The third node 210 in this group may include the delegation signer (DS) resource record for the dot COM zone's KSK. The third node, DS resource record 210, may be signed by the private key corresponding to the root zone's ZSK 206, and may contain the hash of the dot COM zone's KSK (see 214, below).

As shown in FIG. 2, the nodes in the dot COM zone group 212 may be arranged in a manner that is similar to nodes 204, 206, and 210 of the root zone group 202. Thus, KSK resource record 214 may authenticate ZSK resource record 216 via a digital signature, ZSK resource record 216 may authenticate DS resource record 218 for example.com via a digital signature, and DS resource record 218 may authenticate the KSK in the next group 220 by including, for example, a hash value of the KSK of the next resource record 222.

The last group of nodes, for the example.com zone group 220, may start with the KSK-to-ZSK arrangement (222, 224, 226) and may further include a ZSK-to-object arrangement (224, 228, 230), where the ZSK resource record 224 authenticates the last node (228, 230) using a digital signature. As shown in the non-limiting example of FIG. 2, the last nodes (228, 230) may include AAAA resource record 228 and A resource record 230 for www.example.com. Resource records 228 and 230 may be authenticated via a digital signature by the private key corresponding to the example-.com zone's ZSK (of resource record 224). There are thus two trust chains of length nine nodes shown in the example of FIG. 2, one including 204, 206, 210, 214, 216, 218, 222, 224, and 228, and the other including 204 206, 210, 214, 216, 218, 222, 224, and 230. Both begin with the trust chain of length eight nodes including 204 206, 210, 214, 216, 218, 222, and 224.

FIG. 2 reflects only a portion of the DNS resource records that would be present in practice. For example, not shown in FIG. 2 are the name server (NS) resource records that point to the name server for a zone. In practice, the other resource records, including the NS records, may also be signed by the ZSK for the zone. According to some embodiments, the name server resource records may not be part of the trust chain from the trust anchor to the object, but instead may be part of a trust chain to the name server where DNS resource records corresponding to other nodes, including the object, are obtained. Further, FIG. 2 does not show the full array of domains within each zone.

III. Setup Phase

Figure 3:
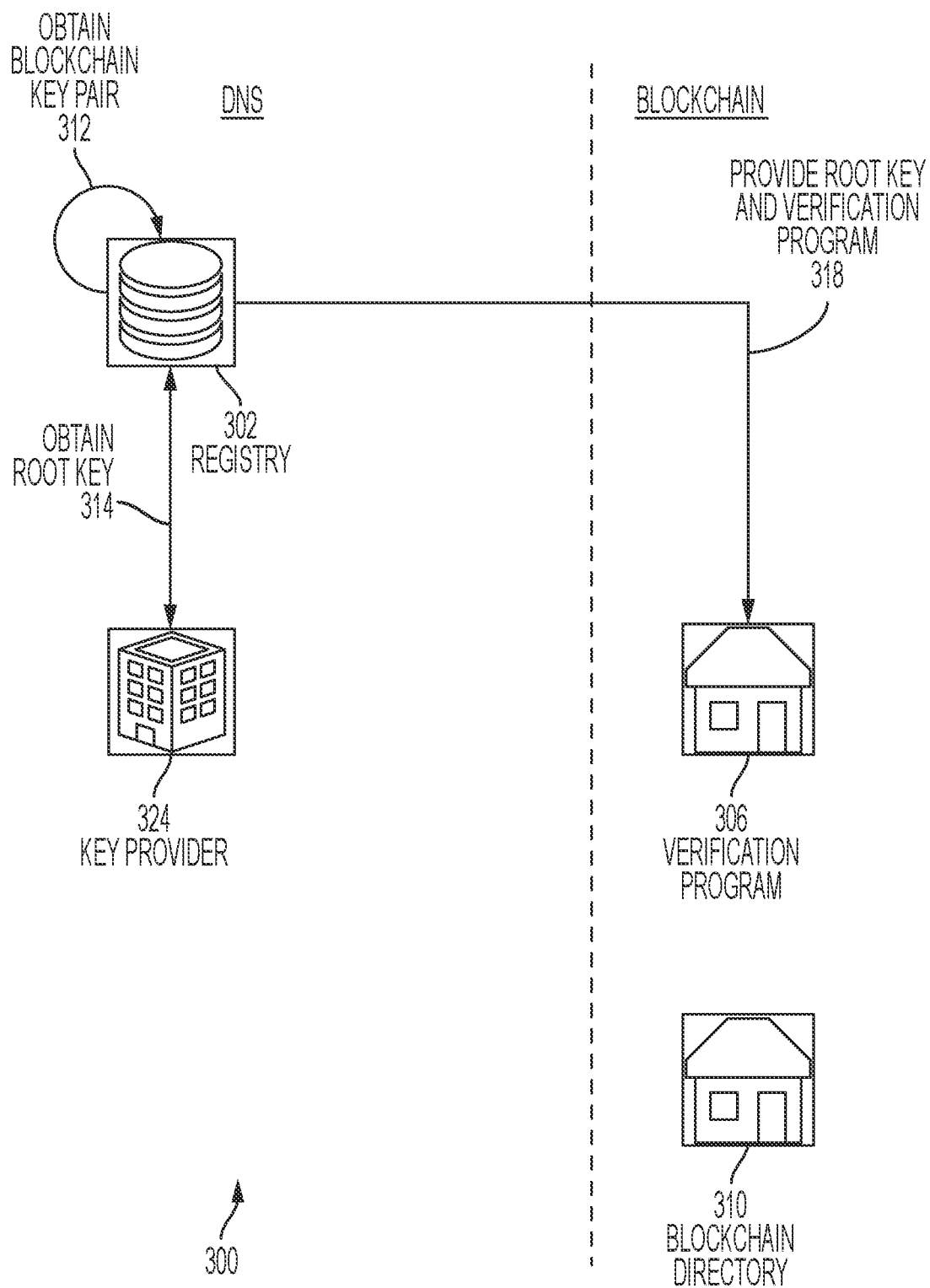
FIG. 3 is a schematic diagram of a setup technique for preparing to prove control of a top level network identifier according to various embodiments.

FIG. 3 is a schematic diagram of a setup technique 300 for preparing to prove control of a top level network identifier according to various embodiments. Setup method 300 may be performed to establish and configure the hardware, software, and protocol components used to perform the methods shown and described below in reference to FIGS. 4-7. By way of a non-limiting example, the left hand side of the diagram depicts the DNS environment, which may more generally be a network identifier infrastructure environment, and the right hand side depicts the blockchain environment, which may more generally be any environment that utilizes network addresses. By way of non-limiting example, set up method 300 is described in reference to registry 302. However, embodiments are not so limited, and set up method 300 may be performed by any of a variety of entities, such as registrars or registrants.

Setup methods 300 may begin with registry 302 obtaining 312 a blockchain key pair. This blockchain key pair is the registry's 302 blockchain key pair, which registry 302 may use to perform blockchain transactions. According to some embodiments, registry 302 may obtain an address instead of, or in addition to, a blockchain public key according to some embodiments. Registry 302 may obtain its blockchain key pair (and/or private key and address) by generating them itself, or by acquiring them from a different entity, such as a certificate authority.

According to some embodiments, registry 302 may obtain its blockchain key pair (and/or private key and address) 312 through the use of, or by acquiring, an electronic wallet. Such a wallet may be a computer executable software program or application that facilitates interactions with a blockchain network. The wallet may execute on a user device such as a personal computer or a smart phone. The wallet may be used in cryptocurrency blockchain networks to facilitate the sending and receiving of cryptocurrency with other users in the network. A wallet may have built in user-callable functionality to generate blockchain key pairs (and/or private keys and addresses) and send and receive cryptocurrency. A wallet, as contemplated herein, may have additional functionality as described further herein.

Registry 302 may also obtain 314 a root public key from key provider 324, e.g., IANA. For example, the root public key may be a public key of an asymmetric key pair that also includes a root private key. The root zone public key may form at least part of an external trust anchor, e.g., for a DNSSEC implementation. The root public key may be used to verify a signature on a key signing key for a top level domain, for example.

Further, according to setup method 300, registry 302 may provide 318 a computer executable verification program 306 for inclusion in the blockchain. Verification program 306 may be in the form of a blockchain smart contract according to some embodiments. Registry 302 may include a copy of the root public key in or accessible by verification program 306. In operation, verification program 306 may perform a verification algorithm, such as, for example, defined by its computer executable code. According to an embodiment, the verification algorithm may accept as input all or part of a trust chain, determine whether the input is valid, e.g., using the root public key, and output a response indicating whether the input is valid or invalid. To validate the trust chain, verification program 306 may check each node in the trust chain for validity. Verification program 306 may check multiple types of nodes, e.g., nodes (such as ZSK or DS) that are signed by a private key corresponding to a public key of a previous node, and nodes (such as KSK) that have a hash of their public key included in the previous node. In the case of a ZSK or a DS node, the node may be authenticated by verifying its digital signature using the public key of a previous node (e.g., a node one level higher in the trust chain). In the case of a KSK node, the node may be authenticated by comparing a hash of its public key with the contents of a previous node (e.g., a node one level higher in the trust chain). Example algorithms for both types of checks or verifications, referred to as signature verification and delegation verification, respectively, are presented below.

---
1. Input: data, signature on the data, and public key;
2. Apply public key to signature;
3. Check whether signature is valid (e.g., determine whether hash of data matches the public key as applied to the signature);
4. Output: results of determination at step 3.
---

Example Signature Verification Algorithm

---
1. Input: public key from node and data from previous node;
2. Hash public key;
3. Check whether hash of public key is valid (e.g., check whether hash of public key is present in data from prior node);
4. Output: results of determination at step 3.
---

Example Delegation Verification Algorithm

For example, to verify the first link in the trust chain from the root public key to the key signing key in the root zone, verification program 306 may apply the example signature verification algorithm with one or more inputs of the key signing key, the signature on the key signing key, and the root public key, to decrypt the signature on the key signing key by applying the root public key and then checking whether the decrypted signature is valid. In general, verification program 306 may check a trust chain for validity by applying one or more of the above algorithms one or more times, depending on the length of the trust chain and the type of nodes therein. For example, verification program 306 may check the validity of a trust chain by checking the validity of each link in the trust chain, e.g., by applying a signature verification algorithm or delegation verification algorithm to each link, depending on the link type. If all links are determined to be valid, then verification program 306 may output a result of valid, otherwise, it may output a result of invalid.

The presence of verification program 306 on the blockchain may serve as an entry point to associate or link a top level domain name with a blockchain address in the blockchain environment. Once verification program 306 is added to the blockchain per the request of registry 302, registry 302 receives back an address of the blockchain indicating where verification program 306 is stored in the blockchain. This address may serve as a blockchain address for verification program 306.

Further according to setup method 300, some embodiments may ensure that an executable program, e.g., blockchain directory 310, for associating domain names that are under the top level domain with blockchain addresses, is present on the blockchain. Blockchain directory 310 may keep track of which blockchain addresses are associated with which domain names in the blockchain. According to some embodiments, blockchain directory 310 is embodied by a program stored in the blockchain. According to such embodiments, blockchain directory 310 may be implemented as a smart contract. For example, blockchain directory 310 may be implemented as an executable computer program or a transaction protocol that is intended to automatically execute under conditions specified in the program or protocol. In operation, blockchain directory 310 may accept as input a command to associate a specified domain name (e.g., a domain name under the top level domain name) with a specified blockchain address, and may store a record of such association upon processing such a command. For example, blockchain directory 310 may include or utilize a table of such stored associations between domain names and blockchain addresses.

Some blockchain networks permit users to use names having particular specified formats as their blockchain addresses. For such blockchains, the existing name services program on the blockchain can be adapted to store an association of a blockchain address with a domain name. For example, for some embodiments, an existing name services smart contract may be used as, or adapted for use as, blockchain directory 310.

Whether newly added to the blockchain or adapted from an existing name service, blockchain directory 310 may be implemented as a smart contract on the blockchain. Consequently, blockchain directory 310 may have an associated blockchain address.

As a further part of set up method 300, registry 302 may store the blockchain address for blockchain directory 310 in the DNS. For example, registry 302 may form a text (TXT) resource record that includes the blockchain address in the text field. Registry 302 may include the TXT resource record for storage in a zone file for a particular zone, depending on the particular embodiment. For example, according to some embodiments, e.g., embodiments as shown and described below in reference to FIG. 4, the resource record is included in a zone file referenced by the root zone. According to some embodiments, e.g., embodiments as shown and described below in reference to FIGS. 5 and 6, the resource record is included in the zone file for a name server that is specified in a Start Of Authority (SOA) resource record. These and other set up procedures are further described below in reference to FIGS. 4, 5, and 6, as they relate to various embodiments.

According to some embodiments, the functionality of the verification program 306 and the functionality of the blockchain directory 310 may be merged, such as by merging the verification program 306 and the blockchain directory 310. For example, a single smart contract present on the blockchain at a single blockchain address may perform the functions of both verification program 306 and blockchain directory 310 as described herein.

IV. Execution Phase

Figure 4:
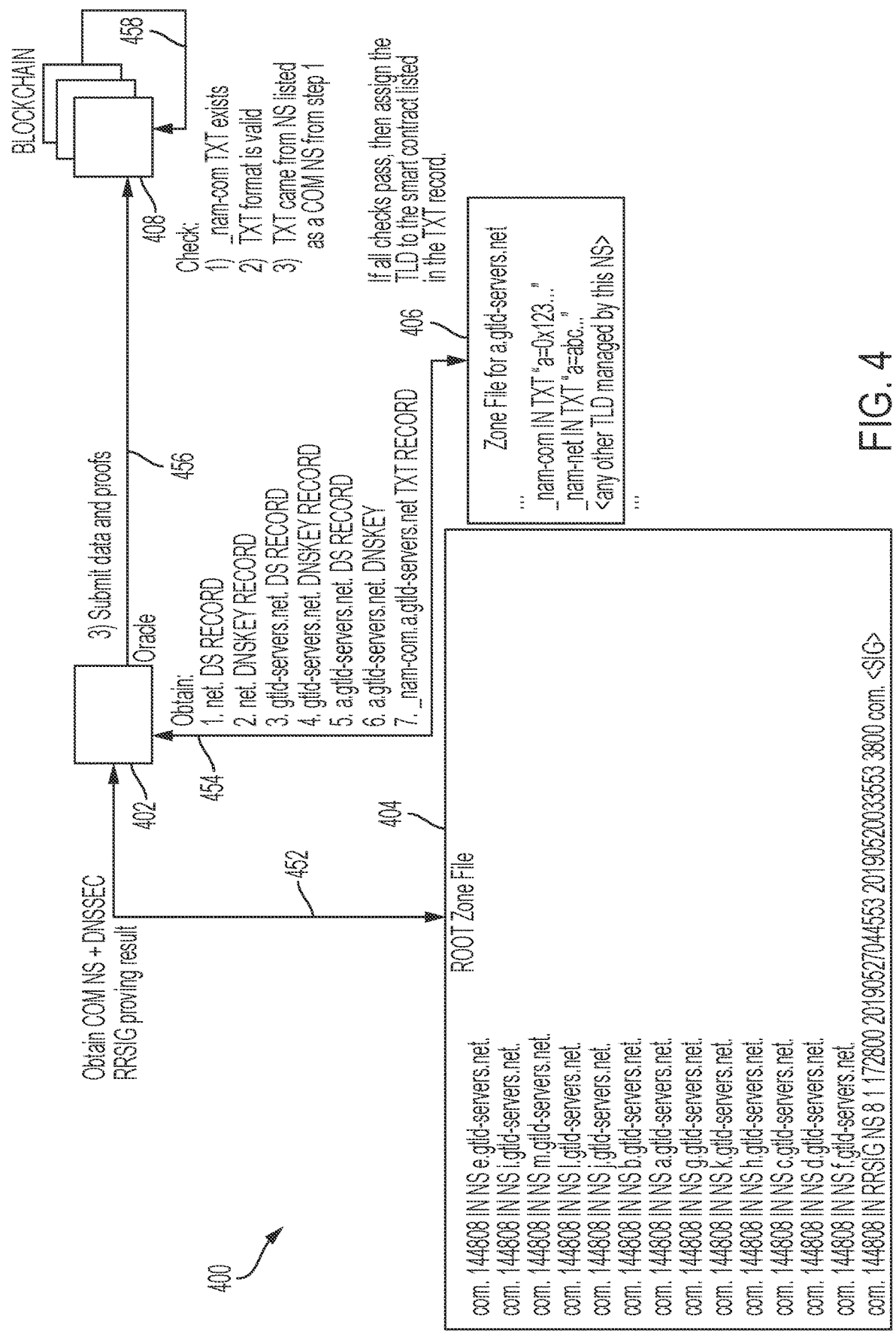
FIG. 4 is a schematic diagram for a name server based method of proving control of a top level domain name according to various embodiments.

FIG. 4 is a schematic diagram for a name server based method 400 of proving control of a top level domain name according to various embodiments. By way of non-limiting example, method 400 is described in reference to a top level domain, for purposes of illustration rather than limitation, dot COM. Method 400 is further described in reference to a blockchain address, e.g., a blockchain address of an executable program on the blockchain, such as blockchain directory 310. Method 400 may be used to prove control of the dot COM top level domain name and associate it with the blockchain address. Subsequently, a registrant of a domain name under the top level domain that also has a blockchain address may interact with blockchain directory 310 or use other techniques to associate its domain name with its blockchain address.

Method 400 may be performed after set up method 300 of FIG. 3 has been performed. As part of method 300 as indicated above, an entity, e.g., registry 302, may form a resource record that includes the blockchain address of blockchain directory 310 and include it for storage in the zone file of one or more name servers identified in root zone file 404. Details of this set up process for the embodiments of FIG. 4 are presented here. As illustrated in FIG. 4, root zone file 404 may specify multiple name servers, the zone file for one of which is depicted as zone file 406. After set up method 300, at least zone file 406 for the name server identified as a.gtld-servers.net, includes text resource records that specify blockchain addresses of blockchain directories for both the dot COM and the dot NET top level domains. Specifically, per set up method 300, registry 302 may form and store in a zone file for one or more name servers (e.g., a.gtld-servers.net, as shown) as specified in the root zone file by, for example, an _nam-com text resource record, or a different record that includes the same information, that includes the blockchain address for blockchain directory 310 for the dot COM top level domain. Embodiments are not limited to the example naming syntax of _nam used herein. According to an embodiment, zone file 406 may also include an _nam-net text resource record (or a record of the same information) that includes the blockchain address for a blockchain directory for the dot NET top level domain. According to some embodiments, the functions of multiple blockchain directories (e.g., for a plurality of top level domain names) may be merged into a single blockchain directory.

Method 400 may be performed by oracle 402, which may be any of a variety of entities according to various embodiments. For example, an oracle may be an entity that interacts with, and provides external data to, a blockchain. According to some embodiments, oracle 402 may include a registry, registrar, or registrant. Oracle 402 includes at least one computer configured to perform the operations described presently.

Method 400 may begin with oracle 402 obtaining 452 an identification of at least one name server for the dot COM top level domain, as well as additional data for validating a trust chain that extends from a trusted authority to the identification of the name server(s). In various embodiments described herein, the anchor for the trust authority is the DNS root zone, which may serve as the trust anchor for both DNSSEC purposes and for blockchain linkage purposes. It should be recognized, however, that in other embodiments, the blockchain-linkage trust chain may be anchored elsewhere, such as at a trust anchor that is specifically designated for this purpose and that does not also serve as a trust anchor for conventional DNSSEC purposes. In some such embodiments, the trust anchor that is specifically designated for blockchain linkage may be governed by the DNS in a manner similar to the DNS root zone governance for DNSSEC purposes.

As shown in the embodiment of FIG. 4, oracle 402 may obtain 452 at least one name server resource record from root zone file 404 for the dot COM top level domain. As shown in FIG. 4, root zone file 404 may include multiple name server resource records, with some or all of the name server resource records each including the characters "NS" in the type field. Each such resource record lists a domain name for a name server for the top level domain, dot COM in this example.

In addition to obtaining 452 the identities of one or more name servers, oracle 402 may further obtains or receives data sufficient for validating a trust chain that extends from a trusted authority to the identity of the name server. Such data may include, for example, a DNSKEY resource record that includes a public key from a key signing key pair, the private key of which is used to sign the zone signing key for the zone. Such data may also include, for example, a DNSKEY resource record that includes a public key from such a zone signing key pair, the private key of which is used to sign the data in zone file 406, including the identities of the name servers such as a.gtld-servers.net. Such data may further include, for example, an RRSIG resource record that includes the zone signing key signature on the contents of root zone file 406. Such data may further include, for example, an RRSIG resource record that includes a key signing key signature on the zone signing key pair public key. From these data, for example, a trust chain from the root public key up to the identity of the name server a.gtld-servers.net may be validated.

Once oracle 402 obtains 452 the identities of one or more name servers, and associated trust chain information, oracle 402 proceeds to obtain 454 data from the corresponding zone file(s). As illustrated in reference to the example zone file 406 for a.gtld-servers.net, oracle 402 may obtain the text resource record, e.g., labeled _nam-com, for the dot COM top level domain, which includes the blockchain address for blockchain directory 310 for the dot COM top level domain. In addition, oracle 402 may validate or obtain information sufficient to validate a trust chain that extends from the root public key up to the _nam-com resource record that includes the blockchain address for verification program 306. Such data may include all or part of, for each of the root zone, the dot net zone, the gtld-servers.net zone, and the a.gtld-servers.net zone: one or more DNSKEY resource records that include zone signing keys and key signing keys in the particular zone, a delegation signer resource record for the particular zone, one or more RRSIG resource records that include a signature on the delegation signer resource record of the particular zone, and one or more RRSIG resource records that include signatures on the zone signing key resource record of the particular zone, and one or more RRSIG resource records for that include a signature on the _nam-com resource record. These data may be used to validate the trust chain from the root zone public key up to the blockchain address for verification program 306 as specified in the _nam-com resource record.

Next, per method 400, oracle 402, or an entity that obtains the proof from the oracle 402 may submit 456 the data obtained 452 from the root zone file and obtained 454 from one or more name server zone files to verification program 306 in blockchain 408. Oracle 402 may do so using any suitable protocol for communicating with blockchain 408.

Verification program 306 may proceed to check 458 whether the provided data is valid. This process may include one or multiple determinations. For example, verification program 306 may determine whether an _nam-com resource record is provided, and if so, whether it is properly formatted and includes a blockchain address. Verification program 306 may determine whether the _nam-com resource record was included in the zone file for a name server that was listed in the root zone file. Verification program 306 may determine whether the trust chain from the root public key up to the identity of the name server a.gtld-servers.net is valid. Verification program 306 may determine whether the trust chain from the root zone public key up to the blockchain address for verification program 306 as specified in an _nam-com resource record is valid. If all of the determinations indicate validity, then verification program 306 may confirm that the blockchain address for dot COM is valid for the particular name server a.gtld-servers.com.

If oracle 402 obtains and submits data from multiple name servers, then check 458 may also include performing a conflict resolution strategy to resolve any conflicting information. Conflicting information may include, for example, different blockchain addresses for verification program 306 in different name server zone files. (The absence of blockchain information in one or more name servers may not be considered a conflict. According to some embodiments, not all name servers listed in zone file 404 have an _nam-com resource record; some may lack blockchain information.) If the conflict resolution is successful, and all other determinations indicate validity, then check 458 may indicate overall validity and method 400 proceeds; otherwise, method 400 may terminate with an error message. Strategies for resolving conflicts may include any one or more of the following:

(1) Require the same information (e.g., verification program blockchain address) from every name server listed in root zone file (for a given TLD) 404 for a conclusion of validity. For example, if root zone file 404 lists multiple name servers, then valid, matching data from each name server is required for overall validity.

(2) Require the same information (e.g., verification program blockchain address) from N of M name servers, where M name servers are listed in root zone file 404 and N<M, for a conclusion of validity. For example, if root zone file 404 lists thirteen name servers, a rule could state it needs valid matching data from seven of the thirteen for overall validity. The preceding example assumes that the thirteen text files list name servers for the same blockchain; however, other embodiments may include text records for any number of blockchains.

(3) Allow conflicts (e.g., of verification program blockchain addresses). For example, if a conflict is detected, data from one name server is selected as being definitive and data from the others is ignored. Practically, this risks oscillating between different valid information from different name servers, but the zone operator may ensure this does not happen (e.g., out-of-band).

(4) Conflicts (e.g., of verification program blockchain addresses) invalidate each other. For example, if a first and second name server listed in root zone file 404 include conflicting information within some time range, then neither information is considered valid. In such a case, method 400 may halt with an error message.

If all determinations, including any conflict resolutions, of check 458 are passed, then method 400 may proceed to associate the top level domain (dot COM in this example) with the blockchain address listed in the _nam-com text resource record of zone file 406 (or as listed in text resource records of zone files for other name servers per any utilized conflict resolution strategy). The association may be established by recording it in blockchain directory 310, for example. According to some embodiments, such as the continuing example, the top level domain name (dot COM, in the example) is associated with the blockchain address of blockchain directory 310. According to some embodiments, the top level domain name is associated with the blockchain address of verification program 306. According to some embodiments, in which they are merged into a single executable program on the blockchain, the top level domain name is associated with both blockchain directory 310 and verification program 306.

According to some embodiments, once the association is recorded in blockchain directory 310, registry 302 may also submit to the blockchain network for inclusion in the blockchain a transaction that includes the top-level domain name and the blockchain address of verification program 306, signed by the private key of the blockchain key pair of registry 302. The transaction may be submitted to the blockchain network for inclusion in a block to indicate that registry 302 has conveyed control of the top level domain name to blockchain directory 310 at the provided blockchain address, at least for purposes of associating domain names under the top-level domain name with blockchain addresses in the blockchain network.

After method 400 has completed, a first entity may interact with blockchain directory 310 to associate its blockchain address with a domain name that it has registered. Once associated, the first entity may use its domain name as its blockchain address for conducting a blockchain transaction, such as a cryptocurrency transaction. Further, a second entity may utilize the domain name of the first entity as the blockchain address of the first entity, e.g., to conduct a cryptocurrency transaction with the first entity.

Figure 5:
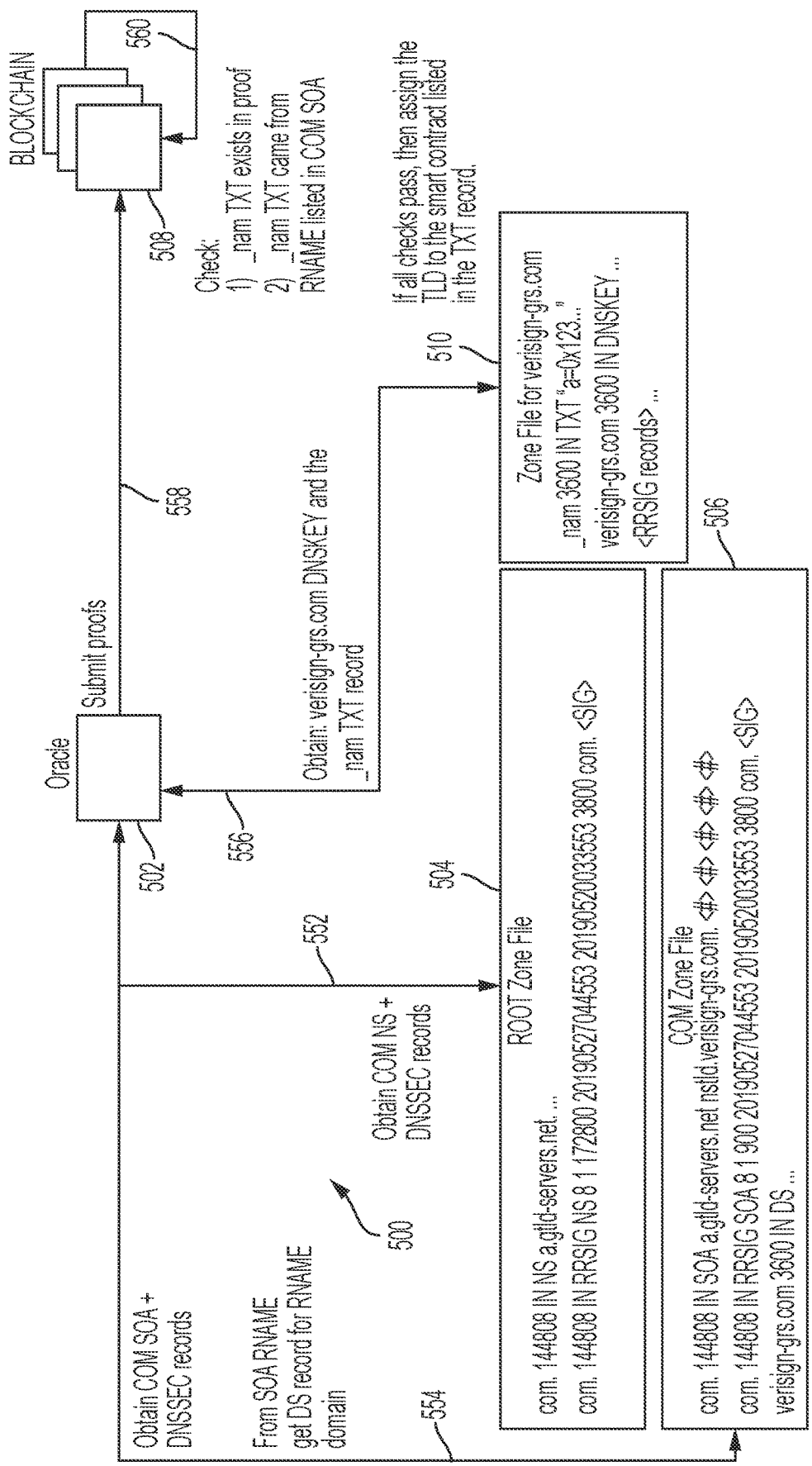
FIG. 5 is a schematic diagram for an RNAME start of authority resource record based method of proving control of a top level domain name according to various embodiments.

FIG. 5 is a schematic diagram for an RNAME Start Of Authority (SOA) resource record based method 500 of proving control of a top level domain name according to various embodiments. By way of non-limiting example, method 500 is described in reference to a top level domain, for purposes of illustration rather than limitation, dot COM. Method 500 is further described in reference to a blockchain address, e.g., a blockchain address of an executable program on the blockchain, such as blockchain directory 310. Method 500 may be used to prove control of the dot COM top level domain name and associate it with the blockchain address. Subsequently, a registrant of a domain name under the top level domain that also has a blockchain address may interact with blockchain directory 310 or use other techniques to associate its domain name with its blockchain address.

Method 500 may be performed after set up method 300 of FIG. 3 has been performed. As part of method 300 as indicated above, an entity, e.g., registry 302, forms a resource record that includes the blockchain address of blockchain directory 310 and includes it for storage in the zone file of a name server identified in a SOA resource record. Details of this process, as well as other set up procedures for the embodiments of FIG. 5, are presented here.

As illustrated in FIG. 5, root zone file 504 is configured to include a resource record that specifies at least one name server, a.gtld-servers.net, for the top level domain name dot COM. The zone file for the dot COM name server, a.gtld-servers.net, is depicted as zone file 506. Per set up method 300, at least zone file 506 is configured to include a specially formed SOA resource record that specifies a zone file, namely zone file 510. Zone file 510 is configured to include an _nam text resource record that holds the blockchain address for the blockchain directory 310. Thus, per set up method 300, registry 302 stores a specially formed SOA resource record in a zone file (e.g., zone file 506) for one or more name servers (e.g., a.gtld-servers.net, as shown) that are specified in root zone file 504, as described presently.

In general, SOA resource records may include information for distributing resource records from a primary (e.g., master) computer to secondary (e.g., replica) computers. According to an embodiment, the specially formed SOA resource record of the embodiments of FIG. 5 may repurpose the RNAME field in the SOA resource record, which is conventionally reserved for a zone administrator email address, and use it to hold an identification of a zone file that includes an _nam resource record that stores the blockchain address of blockchain directory 310. Thus, set up method 300 for preparing for method 500 may include storing such a specially formed/configured SOA resource record as described in zone file 506, and may also include storing an_nam resource record that specifies the blockchain address for blockchain directory 310 in the zone file for the name server specified in the SOA resource record, namely, zone file 510. In some embodiments, the value in the RNAME field may continue to also/alternatively be used to hold an email address, which provides compatibility with existing implementations that may contact the zone administrator based on the value in the field (e.g., if the value in the field is an email address, then a system may conventionally use the email address to contact the zone administrator).

Method 500 may be performed by oracle 502, which may be any of a variety of entities according to various embodiments. According to some embodiments, oracle 502 includes a registry, registrar, or registrant. Oracle 502 includes at least one computer configured to perform the operations of method 500.

Method 500 may begin with oracle 502 obtaining 552 an identification of at least one name server for the dot COM top level domain, as well as additional data for validating a trust chain that extends from a trusted authority to the identification of the name server(s). Thus, oracle 502 may obtain 552 at least one name server resource record from root zone file 504 for the dot COM top level domain. As shown in FIG. 5, root zone file 504 may include at least one name server resource record, denoted by the characters "NS" in the type field. Each such resource record lists a domain name for a name server for the top level domain, dot COM in this example, namely, a.gtld-servers.net.

In addition to obtaining 552 identities of one or more name servers, oracle 502 may further obtain data sufficient for validating a trust chain that extends from a trusted authority to the identity of the name server. The actions of the obtaining 552 such data may be performed as shown and described above in reference to the obtaining 452 of method 400. From these data, a trust chain may be validated from the root public key up to the identity of the name server a.gtld-servers.net.

Next, oracle 502 may obtain 554 from the identified name server, and parse, the SOA resource record. To do so, for example, oracle 502 may contact the name server identified from the name server resource record in root zone file 504, which is the name server a.gtld-servers.net in this example. Oracle 502 may retrieve the SOA resource record from the dot COM zone file 506 and proceed to parse it to identify a second zone file that includes a resource record specifying the blockchain address of blockchain directory 310. For example, oracle 502 may extract the data present in the RNAME field and remove information that would have been converted to the user component of an email address to obtain a second level domain name identifying the zone file at which the blockchain address may be obtained. In the example illustrated in FIG. 5, oracle 502 obtains "nstld.verisign-grs.com" from the RNAME field and strips away the "nstld" to obtain the domain name "verisign-grs.com".

Oracle 502 may also obtain 554 data sufficient for validating a trust chain up to the SOA resource record. The actions of this operation may include actions as shown and described above in reference to the obtaining 452 of method 400. The data sufficient to validate the trust chain from the root authority to the SOA resource record may include, for example, the root DS (which may be prestored in verification program 306), the root KSK (e.g., as obtained 552), the root ZSK (e.g., as obtained 552), the dot COM DS (e.g., as obtained 552), the dot COM KSK (e.g., as obtained 554), the dot COM ZSK (e.g., as obtained 554), and the dot COM SOA and RRSIG (e.g., as obtained 554).

Oracle 502 may also obtain 554 data for validating a trust chain from the root authority to the zone file identified by the SOA resource record, which includes the text resource record that stores the blockchain address. The data for validating the trust chain from the root authority to the zone file that include the text resource record that stores the blockchain address may include the root DS (which may be prestored in verification program 306), and the verisign-grs.com DS (e.g., as obtained 554).

Next, per method 500, oracle 502 obtains 556 the _nam text resource record from the server identified from the parsed SOA resource record (e.g., from the server identified by verisign-grs.com in the example shown). To do so, oracle 502 may obtain the resource record from zone file 510. Further, oracle 502 obtains data for validating a trust chain from the root public key up to the _nam resource record. The actions of this operation may include actions as shown and described above in reference to the obtaining 452 of method 400. The data obtained 554, 556 may be sufficient to validate the trust chain from the root authority to the zone file that includes the text resource record (e.g., _nam) that stores the blockchain address. Such data may include, for example, the root DS (which may be prestored in verification program 306), the verisign-grs.com DS (e.g., as obtained 554), the verisign-grs.com KSK (e.g., as obtained 556), the verisign-grs.com ZSK (e.g., as obtained 556), and the verisign-grs.com TXT and RRSIG resource records (e.g., as obtained 556).

Next, per method 500, oracle 502 may submit 558 the identification of the name server, verisign-grs.com, for the top level domain name dot COM, the specially formed SOA resource record, the _nam resource record, and the data sufficient to form trust chains to each of the identification of verisign-grs.com, the SOA resource record, and the _nam resource record, to blockchain 508. These data may be submitted 558 to verification program 306, for example. Oracle 502 may do so using any suitable protocol for communicating with blockchain 508.

Verification program 306 may proceed to check 560 whether the provided data is valid. This process may include one or multiple determinations. For example, verification program 306 may determine whether an _nam resource record is provided, and if so, whether it is properly formatted and includes a blockchain address. Verification program 306 may determine whether the _nam resource record is included in a zone file for a domain name identified by the specially formed SOA resource record. Verification program 306 may determine whether the SOA resource record was obtained from a zone file for a name server that was identified by a resource record in the root zone file. Verification program 306 may determine whether the trust chains from the root public key up to each of these data are valid. Such verification may proceed as described above in reference to checking 458.

If all determinations of check 560 are passed, then method 500 proceeds to associate or assign the top level domain (dot COM in this example) with or to the blockchain address listed in the _nam resource record of zone file 510. The association may be established by recording it in blockchain directory 310, for example. According to some embodiments, such as the continuing example, the top level domain name (dot COM, in the example) is associated with the blockchain address of blockchain directory 310. According to some embodiments, the top level domain name is associated with the blockchain address of verification program 306. According to some embodiments, in which they are merged into a single executable program on the blockchain, the top level domain name is associated with both blockchain directory 310 and verification program 306.

According to some embodiments, once the association is recorded in blockchain directory 310, registry 302 may also submit to the blockchain network for inclusion in the blockchain a message that includes the top-level domain name and the blockchain address of verification program 306, signed by the private key of the blockchain key pair of registry 302. The message may be submitted to the blockchain network for inclusion in a block to indicate that registry 302 has conveyed control of the top level domain name to blockchain directory 310 at the provided blockchain address, at least for purposes of associating domain names under the top-level domain name with blockchain addresses in the blockchain network.

After method 500 has completed, a first entity may interact with blockchain directory 310 to associate its blockchain address with a domain name that they have registered. Once associated, the first entity may use its domain name as its blockchain address for conducting a blockchain transaction, such as a cryptocurrency transaction. Further, a second entity may utilize the domain name of the first entity as the blockchain address of the first entity, e.g., to conduct a cryptocurrency transaction with the first entity.

Figure 6:
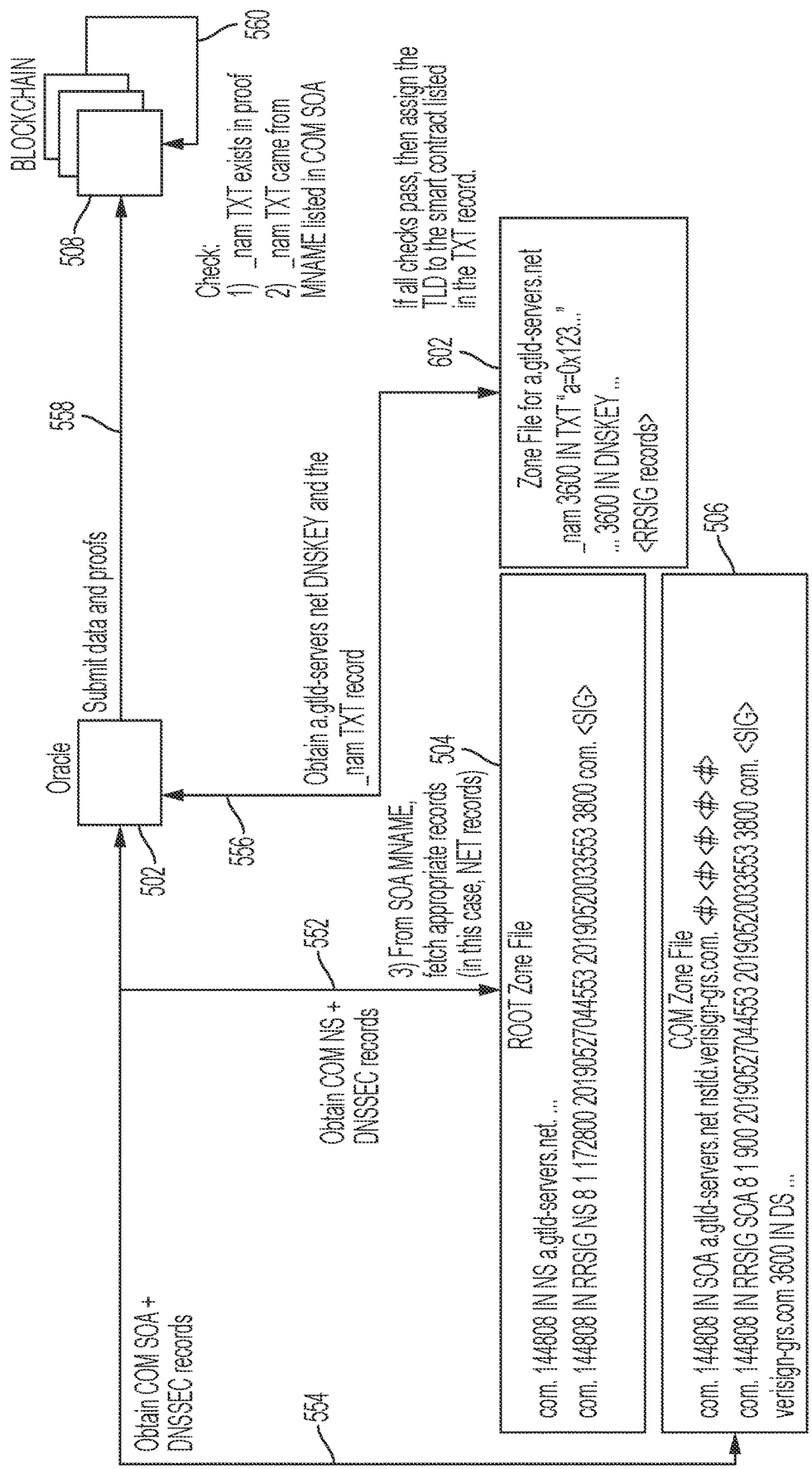
FIG. 6 is a schematic diagram for an MNAME start of authority resource record based method of proving control of a top level domain name according to various embodiments.

FIG. 6 is a schematic diagram for an MNAME SOA resource record based method 600 of proving control of a top level domain name according to various embodiments. Method 600 may be similar or identical to method 500 except where noted.

In particular, method 600 may utilize the MNAME field in an SOA resource record to store an identification of a name server in which an _nam resource record includes the blockchain address of blockchain directory 306. As described above, an SOA resource record may include, for example, information for distributing, from a primary computer to secondary computers, network infrastructure records associating network identifiers under the top level network identifier with network addresses. The specially formed SOA resource record of method 600 repurposes the MNAME field in the SOA resource record, which is reserved for an identification of a primary computer, and instead uses it to hold an identification of a name server, the zone file for which is modified to include an _nam resource record that stores the blockchain address of blockchain directory 310. The specially formed SOA resource record of method 600 may further repurpose the RNAME field to hold an email address of a controller of the top level domain, e.g., oracle 502.

Thus, the set up process for method 600 may include storing the SOA resource record with the customized MNAME field in zone file 506. The set up process for method 600 may also include storing the _nam resource record in zone file 602, which is for the name server identified in the MNAME field of the specially formed SOA resource record.

During execution of method 600, oracle 502 may parse and extract the identification of the name server that includes the _nam resource record in its zone file from the MNAME field of the specially formed SOA resource record, as opposed to the RNAME field of method 500.

The remaining elements and actions of method 600 are as shown and described above in reference to method 500 of FIG. 5.

According to some embodiments of method 600, a second factor authentication is used before verification program 306 stores the association of the top level domain name with the blockchain address of blockchain directory 310. The second factor authentication may be utilized as follows. In addition to some or all of the determinations of check 560, verification program 306 may determine whether an operator of verification program 306 has provided a second factor. Thus, after oracle 502 submits 558 the information that it has obtained to blockchain 508, the operator may fetch the specially formed SOA from zone file 506 and extract the email address of the controller of the top level domain from the RNAME field. The operator may email the operator to confirm that the association is as intended. If the operator receives an affirmative reply, it may pass a second factor authentication datum to verification program 306. The second factor identification can be any of a variety of forms, such as, by way of non-limiting example, a datum signed by the operator. If verification program 306 receives the second factor within a specified time period, it may proceed to associate the top level domain with the blockchain address of blockchain directory 306. Otherwise, if it does not receive the second factor within the specified time period, method 600 may halt with an error message. The specified time period may be, e.g., an hour, a day, a week, a month, or other predetermined amount of time, according to various embodiments.

Moreover, the above-described second factor authentication may similarly be used in or with the other methods and systems described herein; for example, with the checking 458 of FIG. 4 or the checking 560 of FIG. 5, etc.

In addition, some other embodiments may implement email confirmation as a first authentication factor, for example, in place of the RNAME method as described with regard to FIG. 5. In such embodiments, the affirmative reply may be digitally signed (e.g., in a manner similar to a DNSSEC signature on a challenge) to provide evidence that can be stored in the blockchain 508 and independently validated. For instance, the recipient could attach a digital signature with a private key whose public key chains back to an SMIMEA resource record, which is used to associate an end entity certificate or public key with the associated email address. Techniques for obtaining proof of control of an email address are known; for an example, see "https://datatracker.ietf.org/doc/draft-ietf-acme-email-smime/".

Regardless of whether email confirmation is a first or a second factor, a digitally signed email is useful in that it expands the evidence available for validation.

Figure 7:
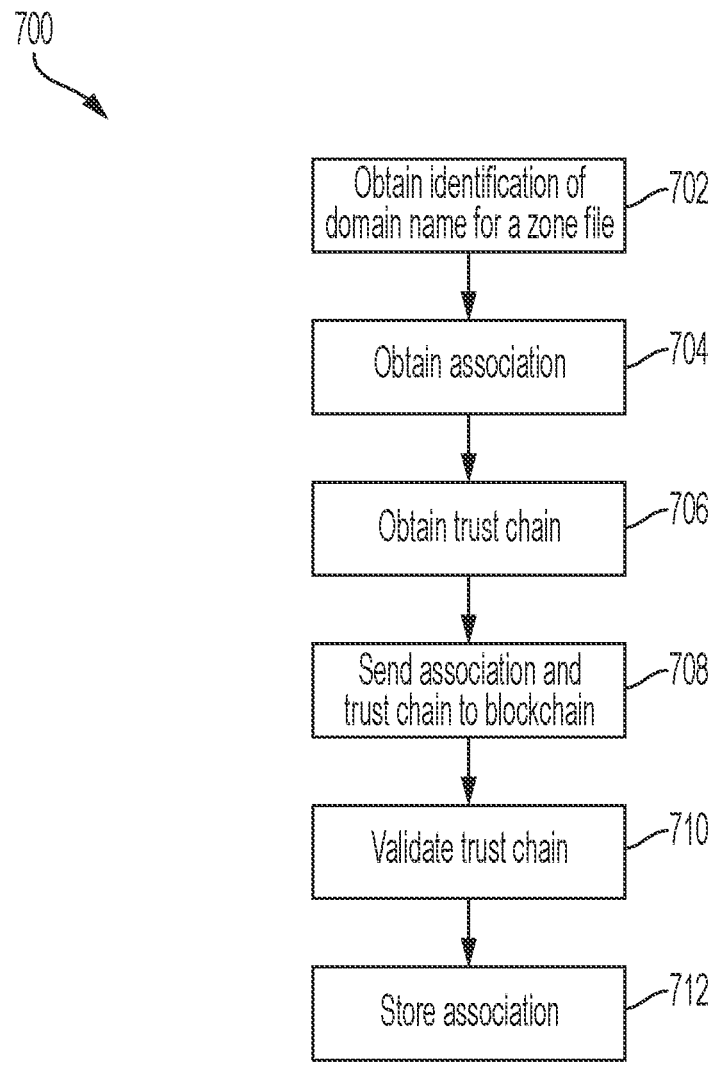
FIG. 7 is a flow diagram for a method 700 of associating a top level network identifier with a blockchain address on a blockchain according to various embodiments.

FIG. 7 is a flow diagram for a method 700 of associating a top level network identifier with a blockchain address on a blockchain according to various embodiments. Method 700 may be implemented using system 800 of FIG. 8, for example. Method 700 may embrace method 400 of FIG. 4, method 500 of FIG. 5, method 600 of FIG. 6, or other methods. Method 700 may be practiced by an oracle, e.g., oracle 402 of FIG. 4 or oracle 502 of FIGS. 5 and 6. Thus, method 700 may be practiced by a registry, a registrar, or a registrant, for example. In general, method 700 may be practiced by an authoritative record keeper or a registration facilitator, for example.

At 702, method 700 includes obtaining, from a root network segment file, an identification of a domain name that identifies a zone file a signature on the identification of the domain. In some embodiments, 702 may further or alternatively include obtaining an identification of a server that stores network infrastructure records associating network identifiers under the top level network identifier with network addresses and a signature on the identification of the server. For example, the root network segment file may be or include a root zone file, and the server may include a name server such as a root name server. According to various embodiments, the actions of 702 may include some or all of the actions of the obtaining 452 of method 400, or some or all of the obtaining 552 of methods 500 and 600.

At 704, method 700 may include obtaining, based on a particular network infrastructure record, which may for example stored in the zone file, an association of the top level network identifier with the blockchain address and a signature on the association of the top level identifier with the blockchain address. According to various embodiments, e.g., embodiments consistent with method 400, the particular network infrastructure record may include the association of the top level network identifier with the blockchain address, and the actions of 704 may include parsing the particular network infrastructure record stored by the server to obtain at least the association of the top level network identifier with the blockchain address. For example, the association may be represented by the top level network identifier and the blockchain address appearing in particular fields in the particular network infrastructure record.

According to various embodiments, e.g., embodiments consistent with methods 500 and 600, the particular network infrastructure record may include an identification of a second server (e.g., a name server identified in the particular network infrastructure record) that stores network infrastructure records associating network identifiers under the top level network identifier with network addresses. According to such embodiments, the actions of 704 may include parsing a second particular network infrastructure record stored by the second server to obtain at least the association of the top level network identifier with the blockchain address. For example, the association may be represented by the top level network identifier and the blockchain address appearing in particular fields in the second particular network infrastructure record.

At 706, method 700 may validate, or obtain information sufficient to validate, a trust chain that extends from a trusted authority (e.g., a root public key provided by an external trust anchor) to the association of the top level network identifier with the blockchain address. The trust chain may include at least the signature for the association of the top level identifier with the blockchain address. According to various embodiments, the actions of 706 may include some or all of the actions of the obtaining 452 and 454 of method 400, or some or all of the obtaining 552,554, and 556 of methods 500 and 600. Thus, the information sufficient to validate the trust chain may include one or more signatures and/or one or more public keys, as shown and described herein in reference to FIGS. 2-6.

At 708, method 700 may include sending at least the association of the top level identifier with the blockchain address and the trust chain to an executable program on the blockchain, e.g., blockchain directory 310, verification program 306, or a different executable program or smart contract. As a consequence, the trust chain is validatable by the executable program on the blockchain using the provided information sufficient to validate it. Once received, the trust chain may be validated 710 by the executable program, and the association may be stored 712 on the blockchain by the executable program that is on the blockchain. According to various embodiments, the actions of 708 may include some or all of the actions of the checking 458 of method 400, or some or all of the checking 560 of methods 500 and 600.

V. Example System and Hardware

Figure 8:
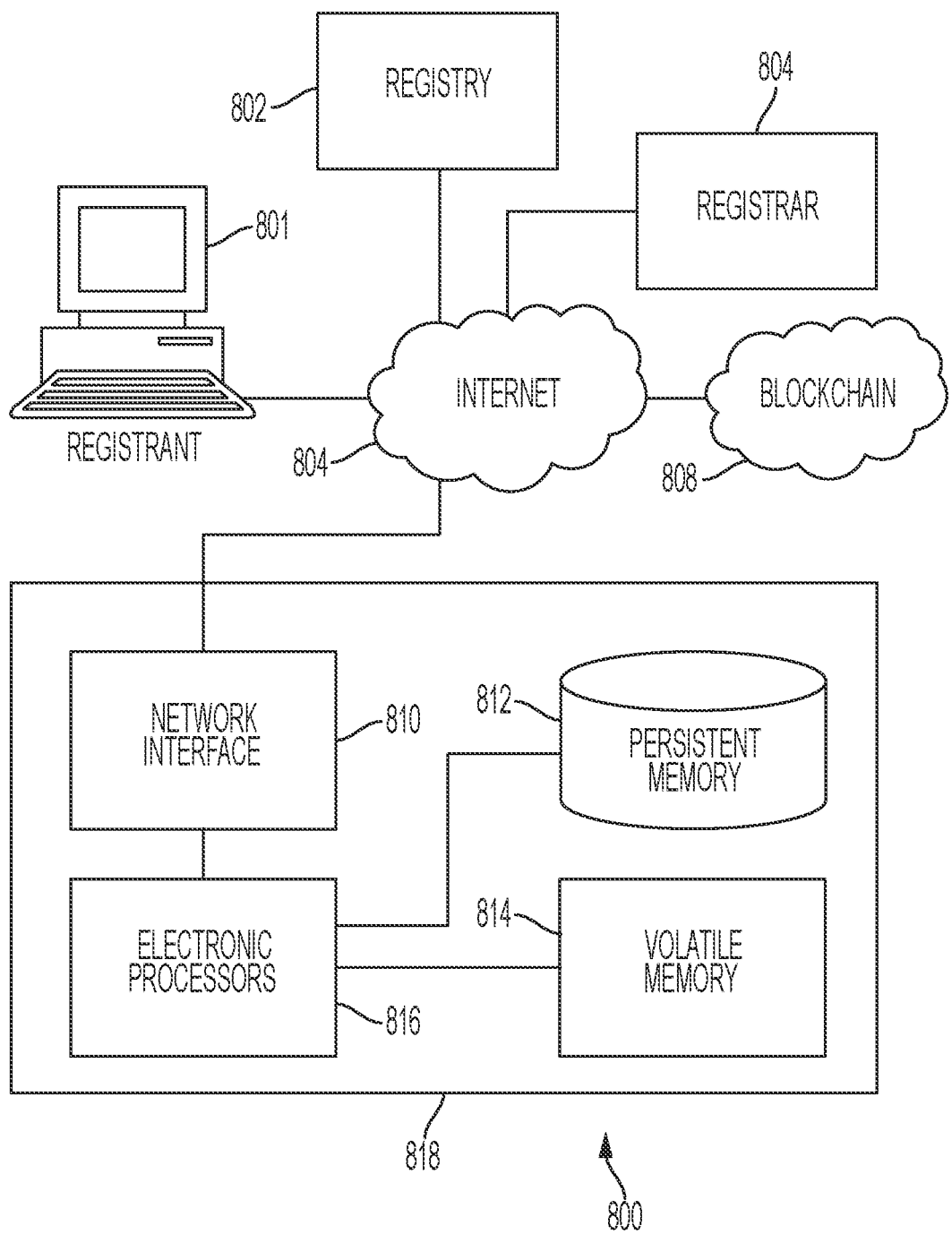
FIG. 8 is a schematic diagram of a system according to various embodiments.

FIG. 8 is a schematic diagram of a system 800 according to various embodiments. System 800 includes, for example, registrant 801 (identified with its computer), registry 802, registrar 804, and server computer 818, all communicatively coupled to the internet 804. System 800 may also include blockchain 808. Server computer 818 may be, for example, a server computer of registry 802, registrar 804, or any DNS operator, according to various embodiments. Registry 802 may be merged with registrar 804 according to various embodiments. For example, FIG. 8 is intended to display the various components networked together, as well as the internal workings of a server computer consistent with the various, e.g., registry and registrar, servers disclosed herein.

Server computer 818 may include network interface 810 to communicatively couple to the internet 804. Network interface 810 may include a physical network interface, such as a network adapter. Server computer 818 may be a special-purpose computer, adapted for reliability and high-bandwidth communications. Thus, server computer 818 may be embodied in a cluster of individual hardware server computers, for example. Alternately, or in addition, server computer 818 may include redundant power supplies. Persistent memory 812 may be in a Redundant Array of Inexpensive Disk drives (RAID) configuration for added reliability, and volatile memory 814 may be or include Error-Correcting Code (ECC) memory hardware devices. Server computer 818 further includes one or more electronic processors 816, which may be multi-core processors suitable for handling large amounts of information. Electronic processors 816 are communicatively coupled to persistent memory 812, and may execute instructions stored thereon to at least partially effectuate the techniques, functions, and operations disclosed herein. Electronic processors 816 are also communicatively coupled to volatile memory 814.

VI. Variations, Modifications, and Alternate Embodiments

Many variations on the disclosed embodiments are possible. Some example variations and modifications are presented below.

Embodiments may be used for namespaces other than blockchain namespaces. For example, embodiments may be used to associate or link a top level network identifier with a network address in a network other than a blockchain.

Embodiments may associate a top-level network identifier other than a top level domain name with a blockchain address in a blockchain network. Examples of such top level network identifiers include, but are not limited to, social media handles, telephone number area codes or exchanges, email address domains, digital object architecture handles, and/or other top level network identifiers. For instance, a social media handle may be associated with a blockchain address by encoding an identifier for the social media platform as part of a domain name in lieu of a TLD as described with respect to other embodiments disclosed herein.

Additional embodiments for proving control of a top level network identifier, such as a top level domain name, are presented below.

A. Registry for Listing Associations of Top Level Network Identifiers with Blockchain Addresses Embodiments according to this subsection may utilize a new registry, e.g., a new DNS registry, to store and provide associations of top level network identifiers, e.g., top level domain names, with network addresses, e.g., blockchain addresses. The registry may, in general, store a new association provided to it, e.g., by a registrar. The registry may be an authoritative source for such associations. Further, the registry may provide associations and related information, such as signatures as described below, to resolvers and other entities.

A registry according to this subsection may provide a signature on an association. For example, a registry according to this subsection may utilize a private key of an asymmetric cryptographic key pair to produce a signature on one or more associations. The registry may store each association together with its signature. For example, the registry may utilize a DNS resource record, such as a text resource record, to store an association of a top level network identifier with a network address. As another example, the registry may store the corresponding signature in the same or a different DNS resource record, e.g., a RRSIG resource record.

According to some embodiments, the registry may publish and/or provide the public key of its key pair, such as an asymmetric cryptographic key pair, to an executable program, e.g., a smart contract, present on the blockchain. For example, the blockchain may provide its public key to verification program 306 and/or blockchain directory 310. Subsequently, the executable program may receive an association and signature as stored at the registry and provided to the executable program by any entity, such as the registry, verify the registry's signature using the public key, and, if valid, store the association in the blockchain environment, e.g., in blockchain directory 310. According to some embodiments, the association may be of a top level domain name with a blockchain address for an executable program on the blockchain, e.g., verification program 306 or blockchain directory 310.

According to some embodiments, IANA may establish a registry according to this subsection.

B. Special-Use Domain Name

Embodiments according to this subsection may store associations of top level network identifiers, e.g., top level domain names, with network addresses, e.g., blockchain addresses, in the zone file for a new domain name, e.g., a special-use top level domain name. Such associations may thus be stored in a DNS zone file.

By way of non-limiting example, a predefined character string, such as "blockchain," may be reserved as a special-use top level domain name. According to an embodiment, a second level domain name under "blockchain" may be what is normally a top level domain.

For example, com.blockchain may be a domain name that includes the special-use top level domain name "blockchain" and, as a second level domain name, "com", which is normally a top level domain name. To record an association of dot COM with a blockchain address, the registry for dot COM may store a record, such as a DNS resource record, in the zone file for com.blockchain. More particularly, to store an association of dot COM with a blockchain address, the registry for dot com may store a resource record including a representation of the association in the zone file for com.blockchain. The name for the resource record may have a particular format, e.g., having a leading underscore character. Thus, for example, the registry for dot com may support an association dot com with a blockchain address for a blockchain named "Crypto Blockchain" by adding a DNS resource record labeled _CBC to the zone file for com.blockchain. The resource record may include in respective fields the top level domain name dot com and the associated blockchain address in the blockchain named Crypto Blockchain, thereby representing the association.

C. Authoritative Smart Contract

Embodiments according to this subsection may store associations of top level network identifiers, e.g., top level domain names, with network addresses, e.g., blockchain addresses, using an authoritative executable program, e.g., a smart contract, stored on the blockchain. For example, an entity, such as a regulatory body for top level domains, may generate and manage such an executable program. The executable program may be configured to add and remove top level domain names in the blockchain directory, e.g., blockchain directory 310.

According to some embodiments, support for a top level domain name may be added to the executable program, even if the top level domain name is not yet present in any DNS. Nevertheless, according to some embodiments, a proof that the top level domain name exists in the root zone may be used to confirm that the top level domain name exists. The proof may be in the form of information sufficient to validate a trust chain from the root public key to a delegation signer (DS) resource record for the top level domain zone.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps or operations of the method can be performed in a different order than illustrated or simultaneously. Those skilled in the art will recognize that these and other variations are possible within the spirit and scope as defined in the following claims and their equivalents.

What is claimed is:

1. A method of associating a top level domain name with a blockchain address on a blockchain, the method comprising:

obtaining, from a Domain Name System (DNS) root zone file, a DNS resource record comprising an identification of a domain name identifying a zone file, and a DNS resource record comprising a signature on the identification of the domain name for the zone file;

obtaining, based on a first DNS resource record stored in the zone file, an association of the top level domain name with the blockchain address;

obtaining information sufficient to validate a trust chain, wherein the trust chain extends from a DNS root zone to the first DNS resource record, wherein information sufficient to validate the trust chain comprises a signature for the association; and sending the association and the information sufficient to validate the trust chain to an executable program on the blockchain, wherein the trust chain is validatable by the executable program on the blockchain, and wherein the association is storable on the blockchain by the executable program on the blockchain.

2. A method of associating a top level network identifier with a blockchain address on a blockchain, the method comprising:

obtaining, from a root network segment file, an identification of a server that stores network infrastructure records associating network identifiers under the top level network identifier with network addresses and a signature on the identification of the server;

obtaining, based on a first network infrastructure record stored by the server, an association of the top level network identifier with the blockchain address;

obtaining information sufficient to validate a trust chain, wherein the trust chain extends from a trusted authority to the association, wherein information sufficient to validate the trust chain comprises at least a signature for the association; and sending the association and the information sufficient to validate the trust chain to an executable program on the blockchain, wherein the trust chain is validatable by the executable program on the blockchain, and wherein the association is storable on the blockchain by the executable program on the blockchain.

3. The method of claim 2, wherein the first network infrastructure record comprises the association, and wherein the obtaining, based on the first network infrastructure record stored by the server, the association of the top level network identifier with the blockchain address comprises:

parsing the first network infrastructure record stored by the server to obtain the association.

4. The method of claim 3, further comprising:

obtaining, from the root network segment file, an identification of a second server that stores network infrastructure records associating network identifiers under the top level network identifier with network addresses; and obtaining, based on a second network infrastructure record stored by the second server, a second association of the top level network identifier with a second blockchain address;

wherein a conflict between the blockchain address and the second blockchain address is resolved.

5. The method of claim 2, wherein the first network infrastructure record comprises an identification of a second server that stores network infrastructure records associating network identifiers under the top level network identifier with network addresses, wherein the obtaining, based on the first network infrastructure record stored by the server, the association of the top level network identifier with the blockchain address comprises:

parsing a second network infrastructure record stored by the second server to obtain at least the association of the top level network identifier with the blockchain address.

6. The method of claim 5, wherein the second network infrastructure record comprises information for distributing, from a primary computer to a secondary computer, network infrastructure records associating network identifiers under the top level network identifier with network addresses, wherein the information comprises data stored in a field reserved for an email address.

7. The method of claim 5, wherein the second network infrastructure record comprises information for distributing, from a primary computer to a secondary computer, network infrastructure records associating network identifiers under the top level network identifier with network addresses, wherein the information comprises data stored in a field reserved for an identification of the primary computer.

8. The method of claim 2, wherein the trust chain comprises a plurality of nodes between the trusted authority and the association of the top level network identifier with the blockchain address, wherein each node of the plurality of nodes either comprises a signature from a private key of an asymmetric cryptographic key pair associated with a preceding node, or provides a signature from a private key of an asymmetric cryptographic key pair to a succeeding node.

9. The method of claim 8, wherein at least one of the plurality of nodes comprises a key signing key node, a zone signing key node, or a delegation signer node.

10. The method of claim 2, wherein sending the association and the information sufficient to validate the trust chain to the executable program on the blockchain comprises sending, by an authoritative network infrastructure record keeper, at least the association of the top level identifier with the blockchain address and the trust chain to the executable program on the blockchain.

11. A system for associating a top level domain name with a blockchain address on a blockchain, the system comprising:

a memory containing instructions; and a processor, operably connected to the memory, that executes the instructions to perform operations comprising:

obtaining, from a Domain Name System (DNS) root zone file, a DNS resource record comprising an identification of a domain name identifying a zone file, and a DNS resource record comprising a signature on the identification of the domain name for the zone file;

obtaining, based on a first DNS resource record stored in the zone file, an association of the top level domain name with the blockchain address;

obtaining information sufficient to validate a trust chain, wherein the trust chain extends from a DNS root zone to the first DNS resource record, wherein information sufficient to validate the trust chain comprises a signature for the association; and sending the association and the information sufficient to validate the trust chain to an executable program on the blockchain, wherein the trust chain is validatable by the executable program on the blockchain, and wherein the association is storable on the blockchain by the executable program on the blockchain.

12. A system for associating a top level network identifier with a blockchain address on a blockchain, the system comprising:
- a memory containing instructions; and
- a processor, operably connected to the memory, that executes the instructions to perform operations comprising:
  - obtaining, from a root network segment file, an identification of a server that stores network infrastructure records associating network identifiers under the top level network identifier with network addresses and a signature on the identification of the server;
  - obtaining, based on a first network infrastructure record stored by the server, an association of the top level network identifier with the blockchain address;
  - obtaining information sufficient to validate a trust chain, wherein the trust chain extends from a trusted authority to the association, wherein information sufficient to validate the trust chain comprises at least a signature for the association; and
  - sending the association and the information sufficient to validate the trust chain to an executable program on the blockchain, wherein the trust chain is validatable by the executable program on the blockchain, and wherein the association is storable on the blockchain by the executable program on the blockchain.

13. The system of claim 12,
wherein the first network infrastructure record comprises the association, and
wherein the obtaining, based on the first network infrastructure record stored by the server, the association of the top level network identifier with the blockchain address comprises:
parsing the first network infrastructure record stored by the server to obtain the association.

14. The system of claim 13, wherein the operation further comprise:
- obtaining, from the root network segment file, an identification of a second server that stores network infrastructure records associating network identifiers under the top level network identifier with network addresses; and
- obtaining, based on a second network infrastructure record stored by the second server, a second association of the top level network identifier with a second blockchain address;
- wherein a conflict between the blockchain address and the second blockchain address is resolved.

15. The system of claim 12,
wherein the first network infrastructure record comprises an identification of a second server that stores network infrastructure records associating network identifiers under the top level network identifier with network addresses, and
wherein the obtaining, based on the first network infrastructure record stored by the server, the association of the top level network identifier with the blockchain address comprises:
parsing a second network infrastructure record stored by the second server to obtain at least the association of the top level network identifier with the blockchain address.

16. The system of claim 15,
wherein the second network infrastructure record comprises information for distributing, from a primary computer to a secondary computer, network infrastructure records associating network identifiers under the top level network identifier with network addresses, wherein the information comprises data stored in a field reserved for an email address.

17. The system of claim 15,
wherein the second network infrastructure record comprises information for distributing, from a primary computer to a secondary computer, network infrastructure records associating network identifiers under the top level network identifier with network addresses, wherein the information comprises data stored in a field reserved for an identification of the primary computer.

18. The system of claim 12, wherein the trust chain comprises a plurality of nodes between the trusted authority and the association of the top level network identifier with the blockchain address, wherein each node of the plurality of nodes either comprises a signature from a private key of an asymmetric cryptographic key pair associated with a preceding node, or provides a signature from a private key of an asymmetric cryptographic key pair to a succeeding node.

19. The system of claim 18, wherein at least one of the plurality of nodes comprises a key signing key node, a zone signing key node, or a delegation signer node.

20. The system of claim 12, wherein sending the association and the information sufficient to validate the trust chain to the executable program on the blockchain comprises sending, by an authoritative network infrastructure record keeper, at least the association of the top level identifier with the blockchain address and the trust chain to the executable program on the blockchain.

* * * * *